(12) United States Patent
Asami

(10) Patent No.: US 8,130,456 B2
(45) Date of Patent: Mar. 6, 2012

(54) IMAGING LENS AND IMAGING APPARATUS

(75) Inventor: Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 179 days.

(21) Appl. No.: 12/718,621

(22) Filed: Mar. 5, 2010

(65) Prior Publication Data

US 2010/0226020 A1 Sep. 9, 2010

(30) Foreign Application Priority Data

Mar. 6, 2009 (JP) .............................. P2009-053515
Feb. 12, 2010 (JP) .............................. P2010-029106

(51) Int. Cl.
G02B 13/04 (2006.01)
G02B 13/18 (2006.01)
(52) U.S. Cl. ........................................ 359/753; 359/716
(58) Field of Classification Search .................. 359/716, 359/749, 753
See application file for complete search history.

(56) References Cited

U.S. PATENT DOCUMENTS

| 7,518,809 B2 * | 4/2009 | Yamakawa et al. ........... 359/753 |
| 2007/0091458 A1 | 4/2007 | Asami et al. |
| 2008/0068729 A1 | 3/2008 | Asami |
| 2008/0080065 A1 | 4/2008 | Asami |

FOREIGN PATENT DOCUMENTS

| JP | 2001-337268 A | 12/2001 |
| JP | 2005-181596 A | 7/2005 |
| JP | 2007-114546 A | 5/2007 |
| JP | 2007-133324 A | 5/2007 |
| JP | 2008-89813 A | 4/2008 |
| JP | 2008-102500 A | 5/2008 |

* cited by examiner

*Primary Examiner* — David N Spector
(74) *Attorney, Agent, or Firm* — Birch, Stewart, Kolasch & Birch, LLP

(57) ABSTRACT

An imaging lens is provided and includes: in order from an object side thereof, a first lens of a negative lens having a concave surface on an image side thereof and having at least one aspheric surface; a second lens of a positive lens having at least one aspheric surface; a stop; and a third lens of a positive lens having a convex surface on the image side thereof and at least one aspheric surface. The following Conditional Expressions (1) and (2) are satisfied.

$$1.5 < vd3/vd2 \tag{1}$$

$$0.0 < |f1/f23| < 0.5 \tag{2}$$

In which vd2 represents an Abbe number of the second lens at the d-line, vd3 represents an Abbe number of the third lens at the d-line, f1 represent a focal length of the first lens, and f23 represents a composite focal length of the second and third lenses.

9 Claims, 12 Drawing Sheets

EXAMPLE 1

EXAMPLE 4

EXAMPLE 5

EXAMPLE 6

EXAMPLE 2

ω = 77.7°

ω = 53.6°

ω = 0°   COMATIC ABERRATION (E)

EXAMPLE 3

COMATIC ABERRATION (E)

EXAMPLE 5

COMATIC ABERRATION (E)

EXAMPLE 6

Fno.= 2.80    ω= 77.7°    ω= 77.7°    ω= 77.7°

SPHERICAL ABERRATION (A) — ASTIGMATISM (B) — DISTORTION (C) — LATERAL CHROMATIC ABERRATION (D)

— d LINE
--- F LINE
---- C LINE

— SAGITTAL
---- TANGENTIAL

ω= 77.7°

ω= 53.1°

ω= 0°

COMATIC ABERRATION (E)

IMAGING LENS AND IMAGING APPARATUS

This application is based on and claims priority under 35 U.S.C §119 from Japanese Patent Application Nos. 2009-053515 and 2010-029106, filed on Mar. 6, 2009 and Feb. 12, 2010, respectively, the entire disclosure of which is herein incorporated by reference.

BACKGROUND OF THE INVENTION

1. Field of the Invention

The present invention relates to an imaging lens and an imaging apparatus, more particularly, to an imaging lens suitable to be used in a surveillance camera, a cell phone camera, an on-board camera, and the like employing an imaging device such as a CCD (Charge Coupled Device) and a CMOS (Complementary Metal Oxide Semiconductor), and an imaging apparatus having the imaging lens.

2. Description of Related Art

Recently, imaging devices such as CCD and CMOS have been to a great extent miniaturized and the number of pixels thereof excessively increased. In addition, an imaging apparatus main body having the imaging device has also been miniaturized, and thus it is also required to not only achieve favorable optical performance but also weight reduction and miniaturization of an imaging lens mounted therein.

Known wide-angle imaging lenses with three-lens system include lenses disclosed in JP-A-2001-337268, JP-A-2005-181596, JP-A-2007-133324, JP-A-2008-89813 and JP-A-2008-102500. These documents disclose imaging lenses with three-group, three-lens system having an aspheric surface, in which a negative lens, a positive lens, an aperture diaphragm, and a positive lens are arranged in order from the object side. Further, JP-A-2007-114546 discloses an imaging lens with three-group, three-lens system having an aspheric surface, in which a negative lens, a positive or negative lens, an aperture diaphragm, and a positive lens are arranged in order from the object side.

However, in imaging apparatuses in the above-mentioned field, not only the demands for low cost and high performance but also the demand for further miniaturization has become stronger. Further, recently, in addition to these demands, the demand for wide angle has become stronger too. For example, there is a demand for an imaging lens capable of performing photographing with a wide angle of view greater than 130°.

However, the imaging lenses disclosed in JP-A-2001-337268 and JP-A-2005-181596 are not good in view of miniaturization of the lens system. Further, the imaging lenses disclosed in JP-A-2007-133324, JP-A-2008-89813 and JP-A-2008-102500 have small angles of view, and do not satisfy the recent demand for wide angle. The imaging lens disclosed in JP-A-2008-89813 tends to have a wider angle of view than that disclosed in JP-A-2007-133324. Further, the imaging lenses disclosed in JP-A-2005-181596, JP-A-2008-102500, and JP-A-2007-114546 employ glass as a first lens material. Hence, it is possible to manufacture a lens with high weather resistance, but if further cost reduction is required, there is a room for improvement in that costs increase.

SUMMARY OF THE INVENTION

An object of the invention is to provide an imaging lens which has a favorable optical performance, is formed as a low-cost and small-sized system, and has a wide angle of view. Another object of the invention is to provide an imaging apparatus having the imaging lens.

According to an aspect of the invention, there is provided an imaging lens including: in order from an object side thereof, a first lens of a negative lens having a concave surface on an image side thereof and having at least one aspheric surface; a second lens of a positive lens having at least one aspheric surface; and a third lens of a positive lens having a convex surface on the image side thereof and at least one aspheric surface. A stop is disposed between the second lens and the third lens. Assuming that an Abbe number of the second lens at the d-line is $vd2$, an Abbe number of the third lens at the d-line is $vd3$, a focal length of the first lens is $f1$, and a composite focal length of the second and third lenses is $f23$, the following Conditional Expressions (1) and (2) are satisfied.

$$1.5 < vd3/vd2 \quad (1)$$

$$0.0 < |f1/f23| < 0.5 \quad (2)$$

The "concave surface" and "convex surface" in an aspheric surface mean that paraxial regions of the surfaces are concave and convex, respectively.

The imaging lens according to an aspect of the invention has a small number of lenses, for example, at minimum three lenses, and thus it is possible to achieve low costs and a small size. In addition, the aspheric surfaces are formed on the respective lenses, and the configuration of the lenses is appropriately selected, and thus it is possible to achieve miniaturization and a wide angle while securing high performance. Further, in the imaging lens according to an aspect of the invention, materials of the negative second lens and the positive third lens, which are disposed in the front and rear of the stop, are selected so as to satisfy Conditional Expression (1). Thus, the system is advantageous in satisfactorily correcting lateral chromatic aberration. In addition, in the system, power distribution is performed so that the Conditional Expression (2) is satisfied, and thus it is possible to achieve a wide angle, and the system is advantageous in satisfactorily correcting field curvature.

In the imaging lens according to the aspect of an invention, assuming that an absolute value of a radius of curvature at the center of the image-side surface of the first lens is $|R2|$ and an absolute value of a radius of curvature at an effective diameter edge of the image-side surface of the first lens is $|RX2|$, it is preferable to satisfy the following Conditional Expression (3).

$$1.5 < |Rx2|/|R2| \quad (3)$$

Here, the "effective diameter edge" of a lens surface is defined as radially outermost points of the intersection points between the lens surface and all the rays contributed to the image formation. In addition, the "effective diameter" is defined as a diameter of the circle formed of the outermost points.

In an aspect of the invention, the "radius of curvature at the center" is defined as a paraxial radius of curvature.

Further, in the imaging lens according to an aspect of the invention, assuming that a focal length of the second lens is $f2$ and a focal length of the third lens is $f3$, it is preferable to satisfy the following Conditional Expression (4).

$$0.8 < f2/f3 < 2.2 \quad (4)$$

Further, in the imaging lens according to an aspect of the invention, assuming that a distance along an optical axis from an object-side surface of the first lens to an imaging plane is L and a focal length of the whole system is f, it is preferable to satisfy the following Conditional Expression (5). Furthermore, at the time of calculating the distance L, a back focal length is assumed as an air conversion length.

$$5.0 < L/f < 12.0 \quad (5)$$

Further, in the imaging lens according to the aspect of the invention, it is preferable that an Abbe number of the first lens at the d-line is 40 or more, the Abbe number of the third lens at the d-line is 40 or more, and the Abbe number of the second lens at the d-line is 29 or less.

Further, in the imaging lens according to an aspect of the invention, assuming that a distance on the optical axis from an image-side surface of a lens closest to the image side to the imaging plane is Bf and the focal length of the whole system is f, it is preferable to satisfy the following Conditional Expression (6). Furthermore, the Bf corresponds to the back focal length, and at the time of calculating the Bf, the air conversion length is used.

$$1.0 < Bf/f < 2.5 \quad (6)$$

Further, in the imaging lens according to an aspect of the invention, assuming that the focal length of the whole system is f and a center thickness of the first lens is D1, it is preferable to satisfy the following Conditional Expression (7).

$$D1/f < 4 \quad (7)$$

Further, in the imaging lens according to an aspect of the invention, assuming that a radius of curvature of an image-side surface of the second lens is R4 and a center thickness of the second lens is D3, it is preferable to satisfy the following Conditional Expression (8).

$$0.5 < |R4/D3| < 20.0 \quad (8)$$

An imaging apparatus according to an aspect of the invention includes an imaging lens according to the other aspect of the invention.

In a lens system, which includes at minimum three lenses, according to an aspect of the invention, the configuration of the shapes and powers of the respective lenses, the position of the aperture diaphragm, and the like is appropriately set so as to satisfy Conditional Expressions (1) and (2). With such a configuration, it is possible to provide an imaging lens which has a favorable optical performance, is formed as a low-cost and small-sized system, and has a wide angle of view. In addition, it is also possible to provide an imaging apparatus having the imaging lens.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Hereinafter, exemplary embodiments of the invention will be described in detail with reference to the accompanying drawings.

Embodiment of Imaging Lens

Figure 1:
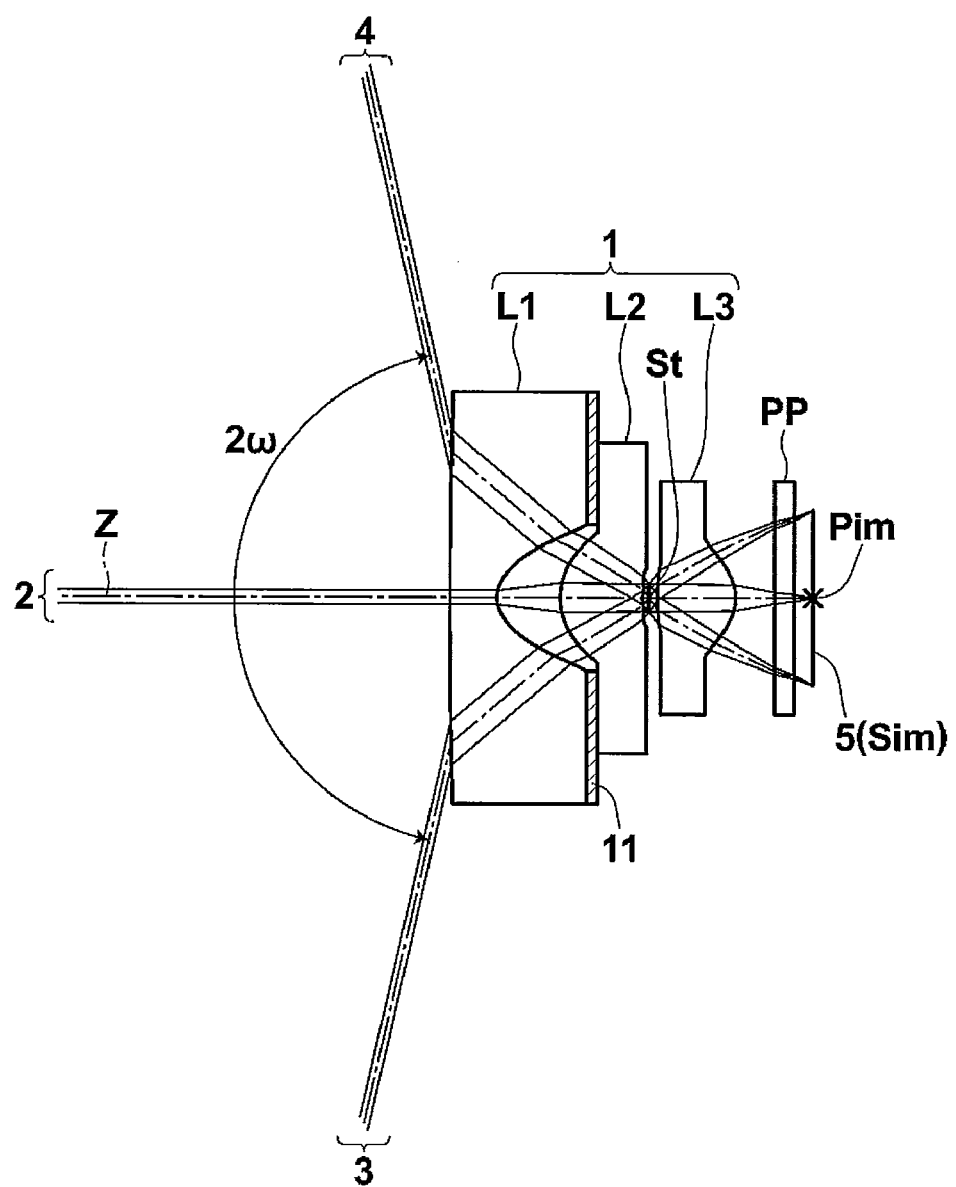
FIG. 1 shows a ray tracing diagram of an imaging lens according to an exemplary embodiment of the invention and a light path therein.

FIG. 1 shows a lens sectional view of an imaging lens 1 according to an exemplary embodiment of the invention. In FIG. 1, the left side of the drawing is the object side, and the right side is the image side, and the on-axis rays 2 from the object point at the infinite distance and the off-axis rays 3 and 4 at the total angle of view 2ω are shown together.

In FIG. 1, considering that the imaging lens 1 is applied to an imaging apparatus, an imaging device 5, which is disposed on an imaging plane Sim including an image point Pim of the imaging lens 1, is shown. The imaging device 5 converts an optical image, which is formed by the imaging lens 1, into an electric signal, in which for example a CCD image sensor, a CMOS image sensor, and the like may be used.

Furthermore, when the imaging lens 1 is applied to an imaging apparatus, it is preferable that a cover glass, a low pass filter, an infrared cut filter, or the like is provided in accordance with a configuration of the camera side equipped with the lens system. FIG. 1 shows an example in which an optical member PP having a plane parallel plate shape assuming the above is disposed between the lens closest to the image side and the imaging device 5 (the imaging plane Sim).

The imaging lens 1 includes: in order from the object side, a negative first lens L1 of which the image-side surface is concave and at least one surface is aspheric; a positive second lens L2 at least one surface of which is aspheric, an aperture diaphragm St as an exemplary embodiment of a stop, and a positive third lens L3 of which the image side is convex and at least one surface is aspheric. Furthermore, the aperture diaphragm St shown in FIG. 1 does not illustrate a shape and a size thereof, but illustrates a position thereof on the optical axis Z.

Since the imaging lens 1 is formed of a small number of lenses, for example, three lenses, it is possible to achieve low costs and a decrease in the total length of the system in the direction of the optical axis.

Since the first lens L1 closest to the object side is formed as a lens which is concave toward the image side and has a negative power, it is possible to achieve a wide angle throughout the whole lens system.

Since the second lens L2 is formed as a lens with a positive power, it becomes easy to correct field curvature and lateral chromatic aberration satisfactorily.

Since the third lens L3 is formed as a lens the image-side surface of which is convex and which has a positive power, it is possible to correct field curvature satisfactorily.

Since at least one surface of each of the first lens L1, the second lens L2, and the third lens L3 is formed to be aspheric, the lens system has a small number of lenses, that is, three lenses, while it is possible to obtain a fine image in which spherical aberration, field curvature, and comatic aberration are corrected.

Further, the aperture diaphragm St is provided between the second and third lenses L2 and L3. With such a configuration, it is possible to miniaturize the third lens L3 in the diameter direction as compared with the case where the aperture diaphragm St is provided between the first lens L1 and the second lens L2, and it is possible to separate the on-axis rays and the rays in the peripheral portion to easily correct field curvature. In addition, it is also possible to miniaturize the second lens L2 and the third lens L3 in the diameter direction as compared with the case where the aperture diaphragm St is provided closer to the object side than the first lens L1. In addition, it is also possible to miniaturize the first lens L1 as compared with the case where the aperture diaphragm St is provided closer to the image side than the third lens L3.

Further, in the imaging lens 1, assuming that an Abbe number of the second lens L2 at the d-line is vd2, an Abbe number of the third lens L3 at the d-line is vd3, a focal length of the first lens L1 is f1, and a composite focal length of the second and third lenses L2 and L3 is f23, the following Conditional Expressions (1) and (2) are satisfied.

$$1.5 < vd3/vd2 \quad (1)$$

$$0.0 < |f1/f23| < 0.5 \quad (2)$$

By satisfying Conditional Expression (1), it is possible to correct lateral chromatic aberration satisfactorily.

By satisfying the upper limit of Conditional Expression (2), it is possible to achieve a wide angle, and it is also possible to correct field curvature satisfactorily.

It is preferable that the imaging lens according to an embodiment of the invention has the following additional configurations. Furthermore, preferably, the lens system may have any one of the following configurations, or may have a combination between any two or more of the following configurations.

It is preferable that the object-side surface of the first lens L1 is convex. If the object-side surface of the first lens L1 is formed to be concave, this enables the first lens L1 to have a strong negative power, and thus is advantageous in a wide angle. However, as incident angles of rays incident at the wide angle of view increase, reflectance at the peripheral portion of the lens increases, thereby decreasing relative illumination. For this reason, the object-side surface of the first lens L1 is formed to be convex, and thus it is possible to suppress loss of light intensity caused by reflection at the peripheral portion of the lens.

When the object-side surface of the first lens L1 is formed to be convex, it is more preferable that the surface is formed as a convex surface having a small power. For example, it is preferable that the radius of curvature of the object-side surface of the first lens L1 is 30 mm or more. Furthermore, the algebraic sign of the radius of curvature is defined to be positive when the surface is convex toward the object side.

Here, the object-side surface of the first lens L1 may not be limited to the spherical surface, and may be formed to be aspheric. In this case, it is possible to correct aberrations further satisfactorily.

It is preferable that at least the image-side surface of the first lens L1 is aspheric. It is preferable that the image-side surface of the first lens L1 has a shape in which the center thereof has a negative power and a negative power at the effective diameter edge thereof is smaller than that at the center. By forming the first lens L1 in such a shape, it is possible to correct distortion satisfactorily while achieving a wide angle.

Figure 2:
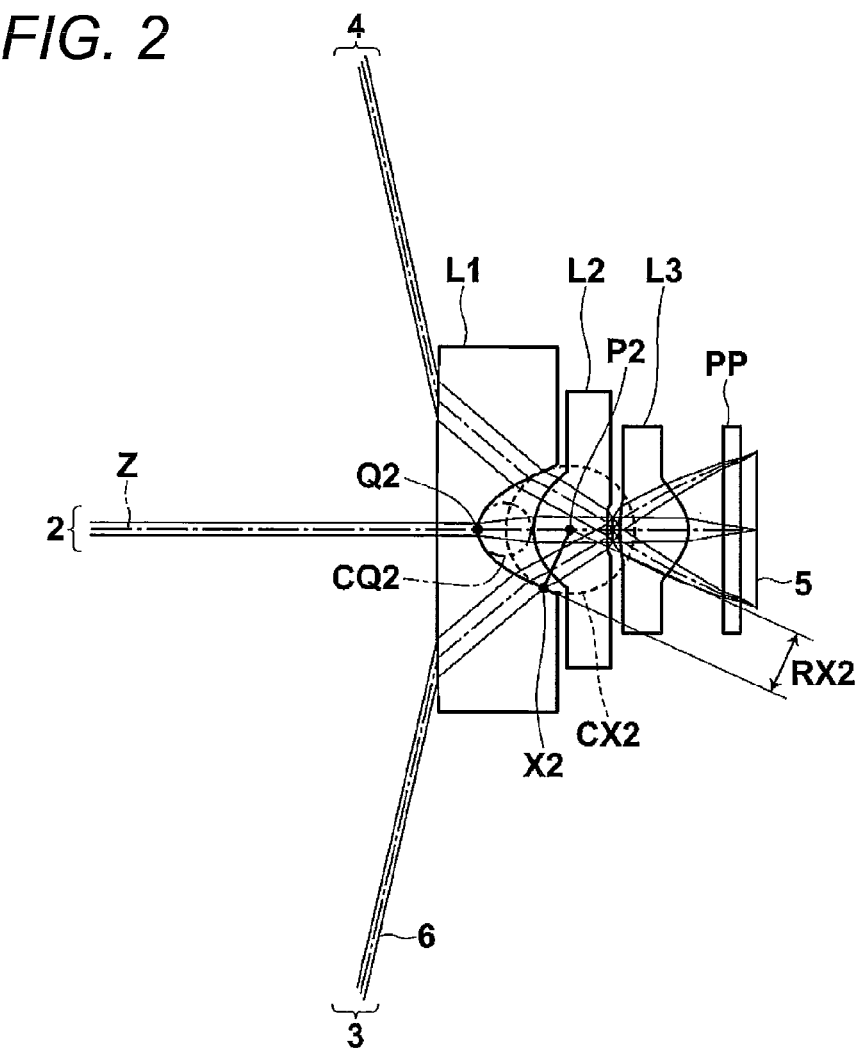
FIG. 2 shows a diagram illustrating a surface shape of a first lens.
Figure 3:
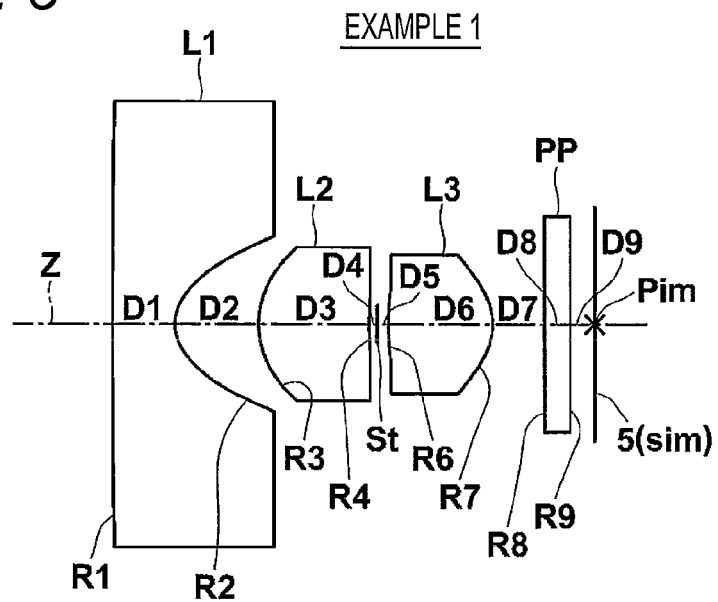
FIG. 3 shows a sectional view illustrating a lens configuration of the imaging lens according to Example 1 of the invention.
Figure 4:
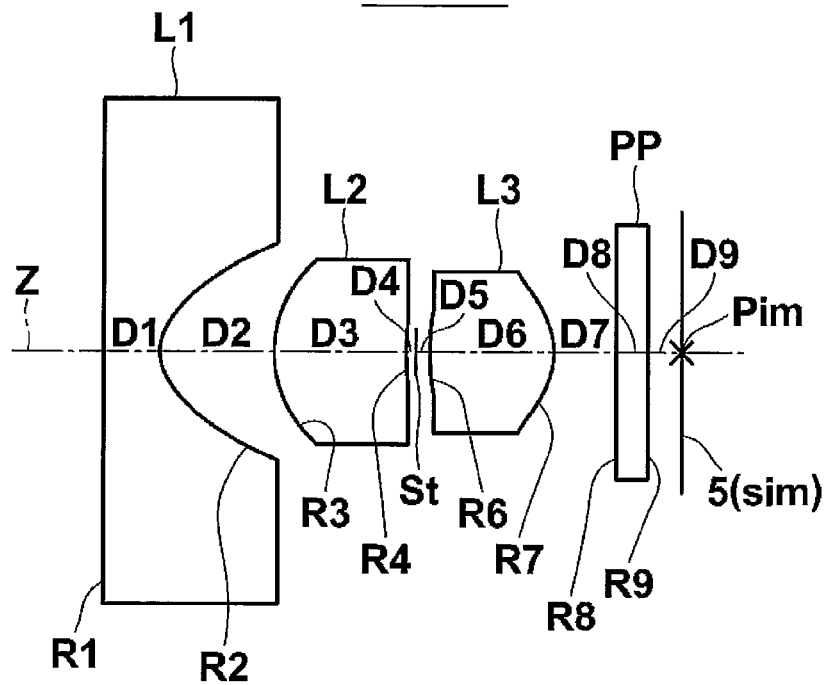
FIG. 4 shows a sectional view illustrating a lens configuration of the imaging lens according to Example 2 of the invention.
Figure 5:
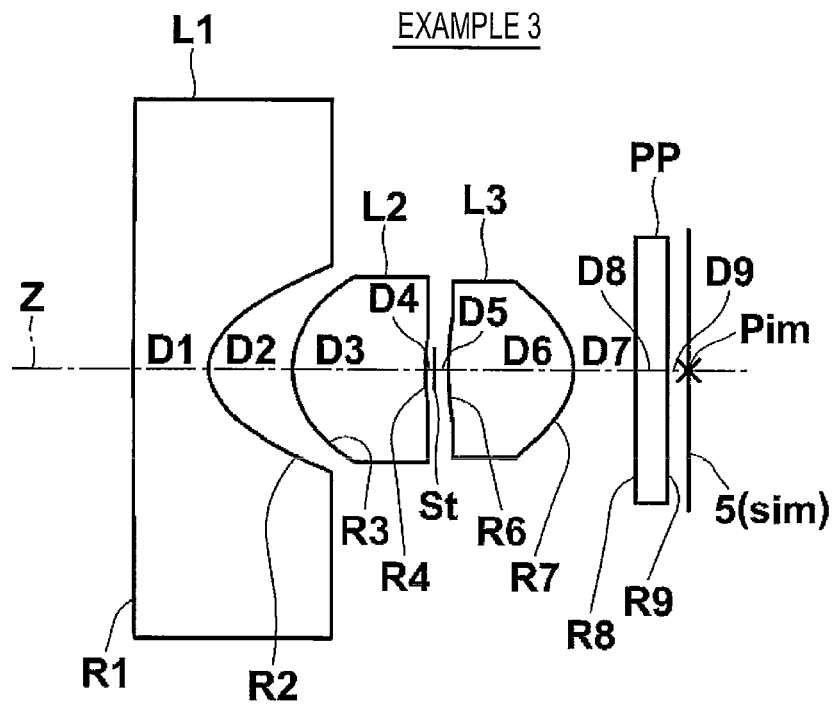
FIG. 5 shows a sectional view illustrating a lens configuration of the imaging lens according to Example 3 of the invention.
Figure 6:
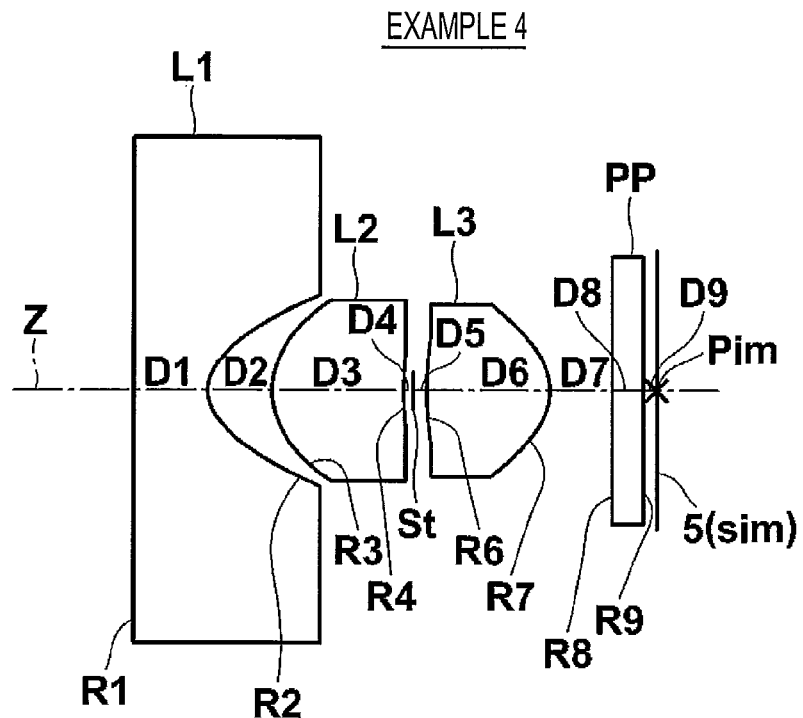
FIG. 6 shows a sectional view illustrating a lens configuration of the imaging lens according to Example 4 of the invention.
Figure 7:
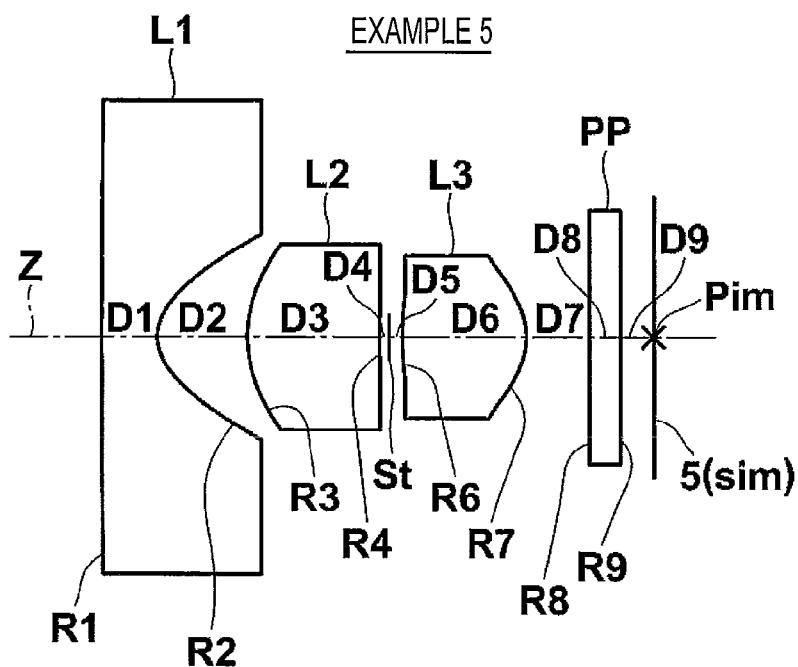
FIG. 7 shows a sectional view illustrating a lens configuration of the imaging lens according to Example 5 of the invention.
Figure 8:
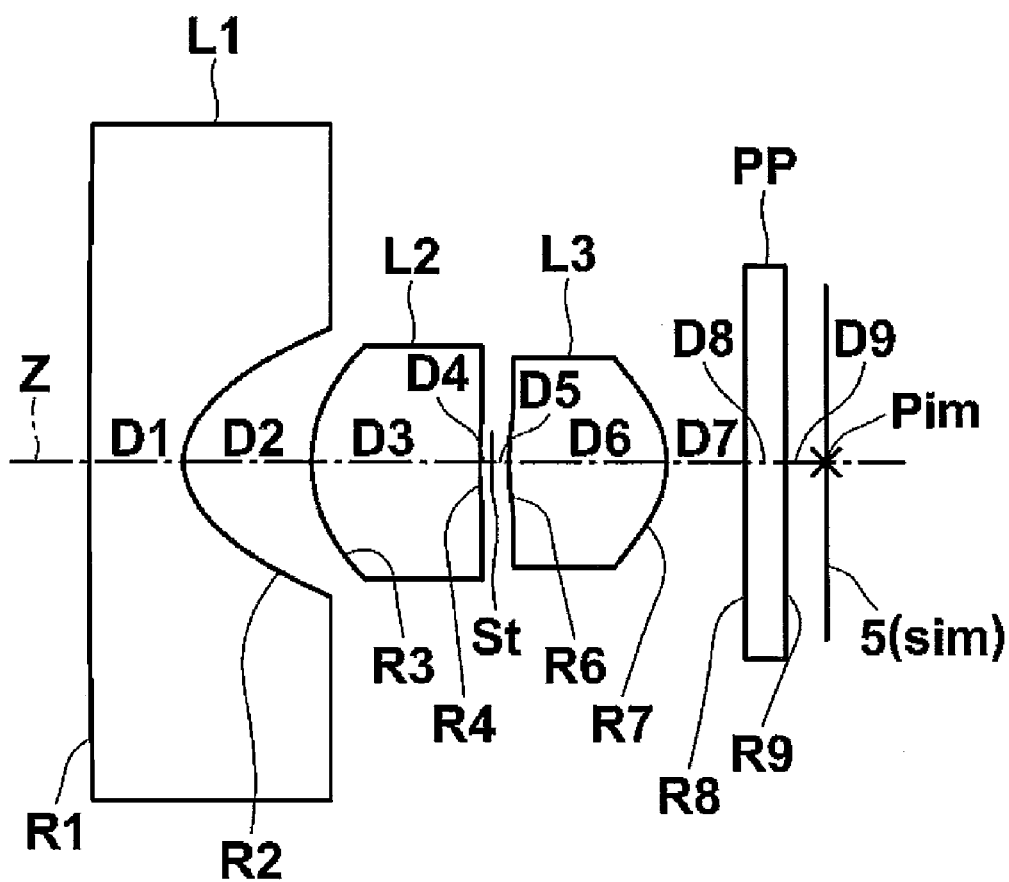
FIG. 8 shows a sectional view illustrating a lens configuration of the imaging lens according to Example 6 of the invention.

The shape of the image-side surface of the first lens L1 is described with reference to FIG. 2. FIG. 2 is a ray tracing diagram of the imaging lens 1, in which some signs are omitted for convenience of explanation. In FIG. 2, the point Q2 is the center of the image-side surface of the first lens L1, and is an intersection point between the image-side surface of the first lens L1 and the optical axis Z. The point X2 shown in FIG. 2 is a point at the effective diameter edge of the image-side surface of the first lens L1, and an intersection point between the image-side surface of the first lens L1 and the outermost ray included in the off-axis rays 3.

In this case, the intersection point between the normal line of the lens surface at the point X2 and the optical axis Z is represented by the point P2 as shown in FIG. 2, and a length of the segment connecting the point X2 and the point P2 is defined as an absolute value of a radius of curvature |RX2| at the point X2. That is, the length of the segment |X2-P2| is equal to |RX2|. Further, the radius of curvature at the point Q2, that is, the radius of curvature at the center of the image-side surface of the first lens L1 is represented by R2. In addition, an absolute value thereof is defined as |R2| (not shown in FIG. 2).

The above description, "the center of the image-side surface of the first lens L1 has a negative power", means that the surface has a concave shape in a paraxial region including the point Q2. Further, the image-side surface of the first lens L1 has "the shape in which a negative power at the effective diameter edge thereof is smaller than that at the center thereof". This means that the surface has a shape in which the point P2 is closer to the image side than the point Q2 and the absolute value of the radius of curvature |RX2| at the point X2 is larger than the absolute value of the radius of curvature |R2| at the point Q2.

In FIG. 2, in order to facilitate understanding, the circle CQ2, which passes through the point Q2 at the radius |R2| and is centered at the point on the optical axis, is represented by the chain double-dashed line, and the circle CX2, which passes through the point X2 at the radius |RX2| and is centered at the point on the optical axis, is represented by the dotted line. In addition, since the circle CX2 is larger than the circle CQ2, |R2|<|RX2| is clarified.

It is preferable that the object-side surface of the second lens L2 has a shape in which the center thereof has a positive power and a positive power at the effective diameter edge thereof is smaller than that at the center. By forming the second lens L2 in such a shape, it is possible to correct field curvature satisfactorily.

The shape of the object-side surface of the second lens L2, similarly to the shape of the image-side surface of the first lens L1 described with reference to FIG. 2, can be described as follows. In the sectional view of the lens system, the effective diameter edge of the object-side surface of the second lens L2 is assumed as the point X3, and the intersection point between the normal line at the point and the optical axis Z is assumed as the point P3. In this case, a length |X3-P3| of the segment connecting the point X3 and the point P3 is defined as an absolute value of a radius of curvature |RX3| at the point X3. Further, the intersection point between the object-side surface of the second lens L2 and the optical axis Z, that is, the center of the object-side surface of the second lens L2 is assumed as the point Q3, and an absolute value of a radius of curvature at the point Q3 is defined as |R3|.

In the above description, the object-side surface of the second lens L2 has "the shape in which the center thereof has a positive power and a positive power at the effective diameter edge is smaller than that at the center". This means that the surface has a convex shape in the paraxial region including the point Q3. In addition, this means that the surface has a shape in which the point P3 is closer to the object side than the point Q3 and the absolute value of the radius of curvature |RX3| at the point X3 is larger than the absolute value of the radius of curvature |R3| at the point Q3.

It is preferable that the absolute value of the radius of curvature |RX3| at the point X3 is larger than 1.05 times the absolute value of the radius of curvature |R3| at the point Q3. That is, it is preferable to satisfy 1.05<|RX3|/|R3|. In this case, it becomes easy to correct field curvature.

It is preferable that the image-side surface of the second lens L2 has a shape in which the center thereof has a negative power and a negative power at the effective diameter edge is larger than that at the center. By forming the second lens L2 in such a shape, it is possible to correct spherical aberration and field curvature satisfactorily.

The shape of the image-side surface of the second lens L2, similarly to the shape of the image-side surface of the first lens L1 described with reference to FIG. 2, can be described as follows. In the sectional view of the lens system, the effective diameter edge of the image-side surface of the second lens L2 is assumed as the point X4, and the intersection point between the normal line at the point and the optical axis Z is assumed as the point P4. In this case, a length |X4-P4| of the segment connecting the point X4 and the point P4 is defined as an absolute value of a radius of curvature |RX4| at the point X4. Further, the intersection point between the image-side surface of the second lens L2 and the optical axis Z, that is, the center of the object-side surface of the second lens L2 is assumed as the point Q4. In addition, an absolute value of a radius of curvature at the point Q4 is defined as |R4|.

In the above description, the image-side surface of the second lens L2 has "the shape in which the center thereof has a negative power and a negative power at the effective diameter edge is larger than that at the center". This means that the surface has a concave shape in the paraxial region including the point Q4. In addition, this means that the surface has a shape in which the point P4 is closer to the image side than the point Q4 and the absolute value of the radius of curvature |RX4| at the point X4 is smaller than the absolute value of the radius of curvature |R4| at the point Q4.

It is preferable that the absolute value of the radius of curvature |RX4| at the point X4 is smaller than 0.8 times the absolute value of the radius of curvature |R4| at the point Q4. That is, it is preferable to satisfy 0.8>|RX4|/|R4|. In this case, it becomes easy to correct spherical aberration and field curvature.

It is preferable that the object-side surface of the third lens L3 has a shape in which the center thereof has a positive power and a positive power at the effective diameter edge thereof is smaller than that at the center. By forming the third lens L3 in such a shape, it is possible to decrease an angle of the principal ray of the off-axis rays incident on the imaging plane. As a result, it is possible to improve so-called telecentricity on the image side.

The shape of the object-side surface of the third lens L3, similarly to the shape of the image-side surface of the first lens L1 described with reference to FIG. 2, can be described as follows. In the sectional view of the lens system, the effective diameter edge of the object-side surface of the third lens L3 is assumed as the point X6, and the intersection point between the normal line at the point and the optical axis Z is assumed as the point P6. In this case, a length |X6-P6| of the segment connecting the point X6 and the point P6 is defined as an absolute value of a radius of curvature |RX6| at the point X6. Further, the intersection point between the object-side surface of the third lens L3 and the optical axis Z, that is, the center of the object-side surface of the third lens L3 is assumed as the point Q6. In addition, an absolute value of a radius of curvature at the point Q6 is defined as |R6|.

In the above description, the object-side surface of the third lens L3 has "the shape in which the center thereof has a positive power and a positive power at the effective diameter edge is smaller than that at the center". This means that the surface has a convex shape in the paraxial region including the point Q6. In addition, this means that the surface has a shape in which the point P6 is closer to the image side than the point Q6 and the absolute value of the radius of curvature |RX6| at the point X6 is larger than the absolute value of the radius of curvature |R6| at the point Q6.

It is preferable that the absolute value of the radius of curvature |RX6| at the point X6 is larger than 0.8 times the absolute value of the radius of curvature |R6| at the point Q6. That is, it is preferable to satisfy 0.8<|RX6|/|R6|. In this case, it becomes easy to correct spherical aberration.

It is preferable that the image-side surface of the third lens L3 has a shape in which the center thereof has a positive power and a positive power at the effective diameter edge is smaller than that at the center. By forming the image-side surface of the third lens L3 in such a shape, it is possible to correct spherical aberration.

The shape of the image-side surface of the third lens L3, similarly to the shape of the image-side surface of the first lens L1 described with reference to FIG. 2, can be described as follows. In the sectional view of the lens system, the effective diameter edge of the image-side surface of the third lens L3 is assumed as the point X7, and the intersection point between the normal line at the point and the optical axis Z is assumed as the point P7. In this case, a length |X7-P7| of the segment connecting the point X7 and the point P7 is defined as an absolute value of a radius of curvature |RX7| at the point X7. Further, the intersection point between the image-side surface of the third lens L3 and the optical axis Z, that is, the center of the object-side surface of the third lens L3 is assumed as the point Q7. In addition, an absolute value of a radius of curvature at the point Q7 is defined as |R7|.

In the above description, the image-side surface of the third lens L3 has "the shape in which the center thereof has a positive power and a positive power at the effective diameter edge is smaller than that at the center". This means that the surface has a convex shape in the paraxial region including the point Q7. In addition, this means that the surface has a shape in which the point P7 is closer to the object side than the point Q7 and the absolute value of the radius of curvature |RX7| at the point X7 is larger than the absolute value of the radius of curvature |R7| at the point Q7.

It is preferable that the absolute value of the radius of curvature |RX7| at the point X7 is larger than 1.5 times the absolute value of the radius of curvature |R7| at the point Q7.

That is, it is preferable to satisfy $1.5<|RX7|/|R7|$. In this case, it becomes easy to correct spherical aberration.

It is preferable that the whole angle of view of the imaging lens 1 is 130° or more. By forming the whole angle of view so as to be 130° or more, the angle of view is sufficient even when the lens is used for an on-board camera or a surveillance camera.

It is preferable that the Abbe number of the first lens L1 at the d-line is 40 or more. Thereby, it is possible to suppress occurrence of chromatic aberration, and thus it is possible to obtain a fine image.

It is preferable that the Abbe number of the second lens L2 at the d-line is 29 or less. Thereby, it is possible to correct lateral chromatic aberration satisfactorily.

It is preferable that the Abbe number of the third lens L3 at the d-line is 40 or more. Thereby, it is possible to suppress occurrence of chromatic aberration, and thus it is possible to obtain a fine image.

Assuming that the focal length of the first lens L1 is f1 and the composite focal length of the second and third lenses L2 and L3 is f23, it is more preferable to satisfy the following Conditional Expression (2-1). By satisfying the lower limit of Conditional Expression (2-1), it becomes easy to miniaturize the lens system.

$$0.15<|f1/f23|<0.5 \quad (2\text{-}1)$$

Assuming that the absolute value of the radius of curvature at the center of the image-side surface of the first lens L1 is |R2| and the absolute value of the radius of curvature at the effective diameter edge of the image-side surface of the first lens L1 is |RX2|, it is preferable to satisfy the following Conditional Expression (3). By satisfying Conditional Expression (3), it is possible to correct distortion satisfactorily.

$$1.5<|RX2|/|R2| \quad (3)$$

In addition, it is more preferable to satisfy the following Conditional Expression (3-1). By satisfying Conditional Expression (3-1), it is possible to correct distortion satisfactorily.

$$2.0<|RX2|/|R2| \quad (3\text{-}1)$$

Assuming that the focal length of the second lens L2 is f2 and the focal length of the third lens L3 is f3, it is preferable to satisfy the following Conditional Expression (4). When the result value of Conditional Expression (4) is equal to or more than the upper limit thereof, it becomes difficult to correct field curvature. When the result value of Conditional Expression (4) is equal to or less than the lower limit thereof, the back focal length decreases. Hence, it becomes difficult to arrange a filter or a cover glass between the lens system and the imaging device.

$$0.8<f2/f3<2.2 \quad (4)$$

It is more preferable to satisfy the following Conditional Expression (4-1). By satisfying the upper limit of Conditional Expression (4-1), it is possible to correct field curvature more satisfactorily. By satisfying the lower limit of Conditional Expression (4-1), it becomes easier to secure the back focal length.

$$1.0<f2/f3<2.0 \quad (4\text{-}1)$$

Assuming that the distance on the optical axis from the object-side surface of the first lens L1 to the imaging plane is L and the focal length of the whole system is f, it is preferable to satisfy the following Conditional Expression (5). Furthermore, at the time of calculating the distance L, a back focal length is assumed as an air conversion length. Specifically, when a cover glass, a filter, or the like is disposed between the lens closest to the image side and the imaging plane Sim, air conversion values are used in the thicknesses of the cover glass, the filter, and the like.

$$5.0<L/f<12.0 \quad (5)$$

When the result value of Conditional Expression (5) is equal to or more than the upper limit thereof, it is possible to achieve a wide angle, but the size of the lens system increases. When the result value of Conditional Expression (5) is equal to or less than the lower limit thereof, it is possible to miniaturize the lens system, but it becomes difficult to achieve a wide angle.

In addition, it is more preferable to satisfy the following Conditional Expression (5-1). By satisfying the upper limit of Conditional Expression (5-1), it becomes easier to achieve miniaturizing. When the lower limit of Conditional Expression (5-1) is satisfied, it becomes easier to achieve a wide angle.

$$7.0<L/f<11.0 \quad (5\text{-}1)$$

Assuming that the distance on the optical axis from the image-side surface of the lens (the third lens L3 in the example shown in FIG. 1) closest to the image side to the imaging plane is Bf and the focal length of the whole system is f, it is preferable to satisfy the following Conditional Expression (6). Furthermore, the Bf corresponds to the back focal length, and at the time of calculating the Bf, the air conversion length is used. Specifically, when a cover glass, a filter, or the like is disposed between the lens closest to the image side and the imaging plane Sim, air conversion values are used.

$$1.0<Bf/f<2.5 \quad (6)$$

When the result value of Conditional Expression (6) is equal to or more than the upper limit thereof, the size of the lens system increases. When the result value of Conditional Expression (6) is equal to or less than the lower limit, the back focal length decreases. Thus, it becomes difficult to insert various filters or cover glasses between the lens system and the imaging device.

In addition, it is more preferable to satisfy the following Conditional Expression (6-1). When the upper limit of Conditional Expression (6-1) is satisfied, it becomes easy to achieve miniaturizing. When the lower limit of Conditional Expression (6-1) is satisfied, it becomes easy to secure the back focal length.

$$1.3<Bf/f<2.3 \quad (6\text{-}1)$$

Furthermore, it is preferable that the back focal length Bf is 1.5 mm or more.

Assuming that the focal length of the whole system is f and a center thickness of the first lens L1 is D1, it is preferable to satisfy the following Conditional Expression (7). By satisfying the upper limit of Conditional Expression (7), it is possible to miniaturize the lens system.

$$D1/f<4 \quad (7)$$

In addition, it is more preferable to satisfy the following Conditional Expression (7-1). By satisfying the upper limit of Conditional Expression (7-1), it is possible to further miniaturize the lens system. By satisfying the lower limit of Conditional Expression (7-1), it is possible to make the first lens L1 infrangible.

$$0.7<D1/f<2 \quad (7\text{-}1)$$

In addition, it is more preferable to satisfy the following Conditional Expression (7-2). By satisfying the upper limit of Conditional Expression (7-2), it is possible to further miniaturize the lens system. By satisfying the lower limit of Conditional Expression (7-2), it is possible to make the first lens L1 more infrangible.

$$0.9<D1/f<1.5 \tag{7-2}$$

It is preferable that D1 is 0.7 mm or more. By setting D1 to be 0.7 mm or more, it is possible to make the lens system infrangible. Further, it is preferable that D1 is 1.0 mm or more. By setting D1 to be 1.0 mm or more, it is possible to make the lens system more infrangible. Furthermore, it is preferable that D1 is 1.2 mm or more. By setting D1 to be 1.2 mm or more, it is possible to make the lens system more infrangible.

Assuming that the radius of curvature of the image-side surface of the second lens L2 is R4 and the center thickness of the second lens L2 is D3, it is preferable to satisfy the following Conditional Expression (8). When the result value of Conditional Expression (8) is equal to or more than the upper limit thereof, it becomes difficult to correct field curvature satisfactorily. In contrast, when the result of Conditional Expression (8) is equal to or less than the lower limit thereof, the center thickness of the second lens L2 excessively increases. Thus, the size of the lens system increases.

$$0.5<|R4/D3|<20.0 \tag{8}$$

Assuming that the focal length of the whole system is f, the air space on the optical axis between the first lens L1 and the second lens L2 is D2, it is preferable to satisfy the following Conditional Expression (9). By satisfying the upper limit of Conditional Expression (9), it is possible to miniaturize the lens system. When the result value of Conditional Expression (9) is equal to or less than the lower limit thereof, the first lens L1 becomes too close to the second lens L2. Thus, it becomes difficult to separate the on-axis rays 2 and the rays in the peripheral portion or the image side surface of the first lens L1 comes into contact with the object side surface of the second lens L2 to restrict the shapes of the aspheric surfaces, and as a result, it becomes difficult to correct filed curvature and distortion.

$$0.9<D2/f<2 \tag{9}$$

Assuming that the focal length of the whole system is f and the air space on the optical axis between the second lens L2 and the aperture diaphragm St is D4, it is preferable to satisfy the following Conditional Expression (10). When the result value of Conditional Expression (10) is equal to or more than the upper limit thereof, the size of the optical system closer to the object side than the aperture diaphragm St in the diameter direction increases. When the result value of Conditional Expression (10) is equal to or less than the lower limit, the aperture diaphragm St becomes too close to the second lens L2. Hence, it becomes difficult to arrange the aperture diaphragm St. Further, since the aperture diaphragm St is close to the second lens L2, it becomes difficult to separate the on-axis rays 2 and the rays in the peripheral portion in each of the first lens L1 and the second lens L2, and as a result, it becomes difficult to correct filed curvature and distortion.

$$0.05<D4/f<0.30 \tag{10}$$

Furthermore, it is more preferable to satisfy the following Conditional Expression (10-1). By satisfying the upper limit of Conditional Expression (10-1), it becomes easy to further miniaturize the lens system. By satisfying the lower limit of Conditional Expression (10-1), it becomes easier to arrange the aperture diaphragm St.

$$0.10<D4/f<0.20 \tag{10-1}$$

Assuming that the focal length of the whole system is f, the air space on the optical axis between the first lens L1 and the second lens L2 is D2, and the center thickness of the second lens L2 is D3, it is preferable to satisfy the following Conditional Expression (11). When the result value of Conditional Expression (11) is equal to or more than the upper limit thereof, the size of the lens system increases. When the result value of Conditional Expression (11) is equal to or less than the lower limit thereof, it becomes difficult to separate the on-axis rays 2 and the rays in the peripheral portion. As a result, it becomes to correct filed curvature satisfactory or it becomes difficult to make the lens system have a wide angle.

$$2.5<(D2+D3)/f<5.0 \tag{11}$$

Assuming that the focal length of the whole system is f and the focal length of the second lens L2 is f2, it is preferable to satisfy the following Conditional Expression (12). When the result value of Conditional Expression (12) is equal to or more than the upper limit thereof, the power of the second lens L2 decreases, and thus it becomes difficult to correct chromatic aberration. When the result value of Conditional Expression (12) is equal to or less than the lower limit thereof, the power of the second lens L2 excessively increases, and allowances for manufacturing errors such as decentration decrease. As a result, it becomes difficult to perform assembly, and it causes an increase in cost.

$$1.0<f2/f<5.0 \tag{12}$$

It is preferable that the first lens L1 is made of plastic. Since the first lens L1 is made of plastic, it is possible to form a low-cost and lightweight lens system, and also it is possible to precisely manufacture the aspheric shapes. Hence, it is possible to manufacture a lens having a desirable performance.

In view of the above-mentioned situation, it is preferable that the second lens L2 is made of plastic. In view of the same situation, it is preferable that the third lens L3 is made of plastic.

In the case where at least any one of the first lens L1, the second lens L2, and the third lens L3 is made of plastic, the material thereof may include a so-called nanocomposite material formed by mixing particulates, which have sizes smaller than a wavelength of light, into the plastic.

When the imaging lens 1 has the first lens L1 which is formed as a plastic aspheric lens so as to be used in a severe environment, such as in an on-board camera, it is preferable that a transparent protective member for protecting the lens system is disposed closer to the object side than the first lens L1. It is preferable that the transparent protective member hardly has any power. For example, it is possible to use a plane parallel plate. It is also preferable that the transparent protective member has high chemical resistance and is hard to be scratched.

The transparent protective member may be made of plastic. It is preferable that any one of acryl, epoxy resin, polycarbonate, PET (Polyethylene terephthalate), PES (Poly Ether Sulphone), and polyolefine based resin is used as the materials of the transparent protective member. By using such a plastic material in a protective member, it is possible to manufacture a low-cost protective member infrangible against impact.

When the first lens L1 is formed as a plastic aspheric lens, a hard coat for increasing the stiffness of the lens may be formed on the object-side surface of the first lens L1. It is preferable to use a hard coat for enhancing the stiffness against an impact on the lens system, scratch resistance, and chemical resistance. By forming the hard coat, it is possible to make the lens system infrangible.

Furthermore, the plastic has lower hardness than the glass, but has higher flexibility. Hence, the first lens L1 is made of plastic, and the hard coat is applied onto the surface thereof, thereby making the lens infrangible against various impacts.

Alternatively, a hydrophobic coat may be applied to the object-side surface of the first lens L1. By using the hydrophobic coat, it becomes difficult to attach drops of water and dirt. Alternatively, a hydrophilic coat may be applied onto the object-side surface of the first lens L1. By using the hydrophilic coat, even when liquid such as water is splashed, water spots are reduced, and are unlikely to form water drops, and thus it is possible to secure transparency. In addition, even when there is dirt, the dirt naturally drops down and washes out, and thus it is possible to secure a field of vision.

The hard coat, the hydrophobic coat, and the hydrophilic coat may be formed on the object-side surface or both surfaces of the transparent protective member which is disposed closer to the object side than the first lens L1. By applying the hard coat, the hydrophobic coat, the hydrophilic coat, or the like to the protective member, it is possible to manufacture a protective member with higher stiffness, higher scratch resistance, and higher chemical resistance.

The imaging lens according to the embodiment of the invention is a wide angle lens, and for example, it is assumed that the total angle of view is 130° or more. Hence, the incident angles of the rays are large in the peripheral portion of the object-side surface of the first lens L1. Accordingly, it is preferable to apply a coat, which has a small wavelength dependency, onto the object-side surface of the first lens L1.

On the image-side surface of the first lens L1, the angle, which is formed between the normal line of the surface and the optical axis Z, is small at the center portion but the angle, which is formed between the normal line of the surface and the optical axis Z, is large at the peripheral portion. Hence, the difference of reflectance between the center portion and the peripheral portion increases, and thus there is concern that the difference will cause a ghost. Accordingly, it is preferable to apply a coat, which has a small wavelength dependency, onto the image-side surface of the first lens L1.

Furthermore, as compared with a multi-layer coat intended to prevent reflection in the predetermined wavelength range, reflectance of a single layer coat relative to a wavelength slowly changes at and near the limit wavelength of the multi-layer coat. From this point, the single coat may be applied onto at least any one surface of the object-side surface of the first lens L1 and the image-side surface of the first lens surface L1.

Furthermore, the first lens L1 may be made of glass. When the imaging lens 1 is used in a severe environment such as in an on-board camera, it is required that the first lens L1 disposed closest to the object side have high resistivity with respect to temperature variance caused by direct rays and surface deterioration caused by rainstorms. In addition, it is required that the lens use a material having high resistivity with respect to chemicals such as oils and cleansers, that is, a material having high water resistance, high weather resistance, high acid resistance, and high chemical resistance. In addition, it is also required that the lens use an infrangible material. By using glass as the material, it is possible to satisfy these requirements.

Further, the second lens L2 may be made of glass. By using glass as the material of the second lens L2, it is possible to suppress deterioration in performance caused by temperature change.

Likewise, the third lens L3 may be made of glass. By using glass as the material of the third lens L3, it is possible to suppress deterioration in performance caused by temperature change.

It is preferable that the glass transition temperatures (Tg) of the materials used in the first lens L1, the second lens L2, and the third lens L3 are 145° C. or more. By using the material having a glass transition temperature of 145° C. or more, it is possible to form a lens with high heat resistance. In addition, it is more preferable that the glass transition temperature of the material is 150° C. or more. By using the material having the glass transition temperature of 150° C. or more, it is possible to form a lens with higher heat resistance.

For example, when the imaging lens 1 is used in an on-board camera as a night vision camera for assisting vision at nighttime, for example, a filter for cutting blue light from ultraviolet light may be interleaved between the lens system and the imaging device 5.

FIG. 1 shows an example in which the optical member PP assumed as various filters or the like is disposed between the lens system and the imaging device 5. Instead, various filters may be disposed between the lenses. Alternatively, a coat having the same effect as the various filters may be applied onto the lens surface of the several lenses included in the imaging lens 1.

In addition, there is a concern that rays passing through the outside of the effective diameter will reach the imaging plane as stray light and become a ghost image, and thus it is preferable to shield the stray light by providing light shielding means. Examples of the shielding means may include an opaque coating material and an opaque plate member provided on a portion outside the effective diameter of a lens. Alternatively, the stray light may be shielded by providing an opaque plate member on the optical path of the stray light, as the shielding means. Alternatively, a hood and the like for shielding the stray light may be disposed closer to the object side than the lens closest to the object side. In FIG. 1, there is shown an example in which shielding means 11 is provided out of the effective diameter range of the image-side surface of the first lens L1. Furthermore, the location, on which the light shielding means is provided, is not limited to the example shown in FIG. 1, and the light shielding means may be disposed on another lens or between lenses.

Furthermore, a member for shielding marginal rays in the range, in which there is no trouble in the relative illumination in practice, may be disposed between the lenses. The marginal rays are defined rays, which are transmitted through the peripheral portion of the entrance pupil of the optical lens system, among rays from the object point except for the optical axis Z. As described above, by arranging the member for shielding the marginal rays, it is possible to improve image quality in the peripheral portion of the imaging area. Further, by allowing the member to shield the light causing the ghost image, it is possible to reduce the ghost image.

Numerical Examples of Imaging Lens

Next, numerical examples of an imaging lens according to an exemplary embodiment of the invention will be described. FIGS. 3 to 8 show the lens sectional views of the imaging lens according to Examples 1 to 6. In FIGS. 3 to 8, the left side of the drawing is the object side, and the right side thereof is the image side. Similarly to FIG. 1, the drawings show the aperture diaphragm St, the optical member PP, and the imaging device 5 disposed on the imaging plane Sim. The aperture diaphragm St shown in the drawings does not illustrate a shape and a size thereof, but illustrates a position thereof on the optical axis Z. In each of the examples, the reference numerals Ri and Di (i=1, 2, 3, . . . ) of each lens sectional view correspond to the reference numerals Ri and Di of each lens data to be described below.

Table 1 shows lens data and various data of the imaging lens according to Example 1, Table 2 shows aspheric surface data, and Table 3 shows radius of curvature data. Likewise, Tables 4 to 18 show lens data, various data, and aspheric surface data of the imaging lenses according to Examples 2 to 6. Hereinafter, the meanings of the reference signs in the tables are described through Example 1, and are basically the same as those of Examples 2 to 6.

In the lens data of Table 1, a surface number Si represents the sequential number of i-th (i=1, 2, 3, . . . ) surface that sequentially increases as it gets closer to the image side when a surface of a component closest to the object side is defined as a first surface. In Table 1, Ri represents a radius of curvature of i-th surface, and Di represents an on-axis surface spacing on the optical axis Z between the i-th surface and the (i+1)th surface. Furthermore, it is assumed that the algebraic sign of the radius of curvature of the surface convex toward the object side is positive, and the algebraic sign of the radius of curvature of the surface convex toward the image side is negative.

Further, in the lens data, Ndj represents a refractive index at the d-line (a wavelength of 587.6 nm) in a j-th (j=1, 2, 3, . . . ) optical element of which the sequential number sequentially increases as it gets closer to the image side when a surface of the optical element closest to the object side is defined as a first surface. In addition, vdj represents an Abbe number of the j-th optical element at the d-line. Furthermore, the lens data also show the aperture diaphragm St and the optical member PP. The item of the radius of curvature of the surface corresponding to the aperture diaphragm St is noted as the aperture diaphragm.

In the various data of Table 1, Fno represents an F number, 2ω represents a total angle of view, IH represents the maximum image height on the imaging plane Sim, Bf represents a distance (corresponds to a back focal length, an air conversion length) on the optical axis Z from the image-side surface of the lens closest to the image side to the imaging plane, and L represents a distance (the back focal length part is air-converted) on the optical axis Z from the object-side surface of the first lens L1 to the imaging plane Sim. In addition, f represents a focal length of the whole system, f1 represents a focal length of the first lens L1, f2 represents a focal length of the second lens L2, f3 represents a focal length of the third lens L3, f12 represents a composite focal length of the first lens L1 and the second lens L2, and f23 represents a composite focal length of the second and third lenses L2 and L3.

In the lens data of Table 1, the reference numeral * is added to the surface numbers of the aspheric surfaces, and numerical values of the radius of curvature (the radius of curvature at the center) near the optical axis are shown as the radius of curvatures of the aspheric surfaces. The aspheric surface data of Table 2 shows the surface numbers of the aspheric surfaces and the aspheric coefficients of the respective aspheric surfaces. In the Table 2, "E-n" (n=integer) in the numerical values of the aspheric surface data means "×10$^{-n}$". Furthermore, the aspheric coefficients are values of the respective coefficients KA and $RB_m$ (m=3, 4, 5, . . . 10) in the following Aspheric Expression (A).

$$Zd = C \cdot h^2 / \{1 + (1 - KA \cdot C^2 \cdot h^2)^{1/2}\} \Sigma RB_m \cdot h^m \quad (A),$$

where

Zd is a depth of an aspheric surface (a length of a perpendicular line dropped from a point, which exists on an aspheric surface at a height h from the optical axis, to a plane, which is perpendicular to the optical axis, tangent to the vertex of the aspheric surface), H is a height (a distance from the optical axis to the lens surface), C is an inverse value of a paraxial radius of curvature, and KA and $RB_m$ are aspheric coefficients (m=3, 4, 5, 10).

The data of the radius of curvature of Table 3 shows surface numbers, absolute values of the radius of curvatures at an effective diameter edge, and ratios of the absolute values of the radius of curvatures at the effective diameter edge to absolute values of the radius of curvatures at the center, with reference to the above mentioned reference signs. For example, the |RX2| represents an absolute value of the radius of curvature at the effective diameter edge of the image-side surface (the second surface) of the first lens L1. In addition, the |RX2|/|R2| represents the ratio of the absolute value of radius of curvature at the effective diameter edge of the image-side surface (the second surface) of the first lens L1 to the absolute value of the radius of curvature at the center thereof. Likewise, the |RX3| represents an absolute value of the radius of curvature at the effective diameter edge of the object-side surface of the second lens L2. In addition, the |RX3|/|R3| represents the ratio of the absolute value of radius of curvature at the effective diameter edge of the object-side surface of the second lens L2 to the absolute value of the radius of curvature at the center thereof. The |RX4| represents an absolute value of the radius of curvature at the effective diameter edge of the image-side surface of the second lens L2. In addition, the |RX4|/|R4| represents the ratio of the absolute value of the radius of curvature at the effective diameter edge of the image-side surface of the second lens L2 to the absolute value of the radius of curvature at the center thereof. The |RX6| represents an absolute value of the radius of curvature at the effective diameter edge of the object-side surface of the third lens L3. In addition, the |RX6|/|R6| represents the ratio of the absolute value of radius of curvature at the effective diameter edge of the object-side surface of the third lens L3 to the absolute value of the radius of curvature at the center thereof. The |RX7| represents an absolute value of the radius of curvature at the effective diameter edge of the image-side surface of the third lens L3. In addition, the |RX7|/|R7| represents the ratio of the absolute value of radius of curvature at the effective diameter edge of the image-side surface of the third lens L3 to the absolute value of the radius of curvature at the center thereof.

Furthermore, Tables 1 to 3 show numerical values which are rounded off to a predetermined decimal place. Regarding units of the numerical values, "degree" is used for 2ω of Table 1, and "mm" is used for the length. However, those are just examples, and other appropriate units may be used since the optical system has the same optical performance even when scaled up or scaled down.

TABLE 1

| Example 1 Lens Data | | | | |
| --- | --- | --- | --- | --- |
| Si | Ri | Di | Ndj | vdj |
| 1 | 200.00 | 1.20 | 1.53 | 55.2 |
| 2* | 0.77 | 1.62 | | |
| 3* | 1.65 | 2.12 | 1.61 | 25.5 |
| 4* | 6.78 | 0.15 | | |
| 5 | Aperture diaphragm | 0.22 | | |
| 6* | 3.91 | 2.00 | 1.53 | 55.2 |
| 7* | −1.20 | 1.00 | | |

TABLE 1-continued

| | | | | |
|---|---|---|---|---|
| 8 | ∞ | 0.50 | 1.52 | 64.2 |
| 9 | ∞ | 0.48 | | |
| Imaging surface | — | 0.00 | | |

Example 1 Various Data

| | |
|---|---|
| Fno. | 2.8 |
| 2ω | 154.4 |
| IH | 2.25 |
| Bf | 1.79 |
| L | 9.09 |
| f | 1.02 |
| f1 | −1.45 |
| f2 | 3.03 |
| f3 | 1.99 |
| f12 | −13.18 |
| f23 | 3.00 |

TABLE 2

Example 1 Aspheric Data

| Si | KA | RB3 | RB4 | RB5 | RB6 |
|---|---|---|---|---|---|
| 2 | 3.69E−02 | −3.04E−02 | −2.19E−02 | 1.26E−02 | 7.54E−03 |
| 3 | 0.00E+00 | −4.30E−02 | 4.93E−02 | −5.93E−02 | 8.09E−03 |
| 4 | 0.00E+00 | −9.33E−02 | 2.09E−01 | 1.40E−01 | −2.01E−02 |
| 6 | 0.00E+00 | −6.09E−02 | 1.00E−02 | 2.48E−02 | 3.60E−02 |
| 7 | 0.00E+00 | −4.67E−02 | 8.98E−02 | −2.23E−02 | −2.5E−02 |

| Si | RB7 | RB8 | RB9 | RB10 |
|---|---|---|---|---|
| 2 | 4.17E−03 | 4.23E−04 | −7.52E−04 | −9.25E−04 |
| 3 | −3.27E−03 | −1.80E−03 | −3.95E−04 | 4.62E−04 |
| 4 | −5.21E−01 | −5.76E−01 | 2.33E−02 | 2.68E+00 |
| 6 | 1.67E−02 | −1.61E−02 | −3.91E−02 | −1.39E−02 |
| 7 | 1.01E−02 | 6.70E−03 | 1.66E−03 | −1.74E−03 |

TABLE 3

Example 1 Data on Radius of Curvature

| Si | Effective Diameter Edge | | Ratio of Effective Diameter Edge to Center | |
|---|---|---|---|---|
| 2 | \|RX2\| | 1.87 | \|RX2\|/\|R2\| | 2.42 |
| 3 | \|RX3\| | 2.03 | \|RX3\|/\|R3\| | 1.23 |
| 4 | \|RX4\| | 5.28 | \|RX4\|/\|R4\| | 0.78 |
| 6 | \|RX6\| | 4.83 | \|RX6\|/\|R6\| | 1.24 |
| 7 | \|RX7\| | 2.27 | \|RX7\|/\|R7\| | 1.89 |

TABLE 4

Example 2 Lens Data

| Si | Ri | Di | Ndj | νdj |
|---|---|---|---|---|
| 1 | ∞ | 0.90 | 1.53 | 55.4 |
| 2* | 0.74 | 1.82 | | |
| 3* | 1.82 | 2.12 | 1.61 | 25.5 |
| 4* | 6.29 | 0.15 | | |
| 5 | Aperture diaphragm | 0.22 | | |
| 6* | 3.86 | 2.00 | 1.53 | 55.4 |
| 7* | −1.16 | 1.00 | | |
| 8 | ∞ | 0.50 | 1.52 | 64.2 |
| 9 | ∞ | 0.54 | | |
| Imaging surface | — | 0.00 | | |

Example 2 Various Data

| | |
|---|---|
| Fno. | 2.8 |
| 2ω | 155.4 |
| IH | 2.25 |
| Bf | 1.87 |
| L | 9.08 |
| f | 0.90 |
| f1 | −1.40 |
| f2 | 3.53 |
| f3 | 1.95 |
| f12 | −6.47 |
| f23 | 2.89 |

TABLE 5

Example 2 Aspheric Data

| Si | KA | RB3 | RB4 | RB5 | RB6 |
|---|---|---|---|---|---|
| 2 | 1.81E−02 | −7.25E−02 | −1.75E−02 | 1.20E−02 | 4.14E−03 |
| 3 | 0.00E+00 | −2.37E−02 | 3.13E−02 | −1.02E−02 | 1.06E−02 |
| 4 | 0.00E+00 | −5.89E−02 | 1.93E−01 | 1.25E−01 | −1.32E−01 |
| 6 | 0.00E+00 | −4.35E−02 | 2.54E−02 | 2.37E−02 | 3.01E−02 |
| 7 | 0.00E+00 | −3.05E−02 | 9.06E−02 | −1.69E−02 | −2.28E−02 |

| Si | RB7 | RB8 | RB9 | RB10 |
|---|---|---|---|---|
| 2 | 2.41E−03 | −5.78E−05 | −3.66E−04 | −1.77E−04 |
| 3 | −1.11E−03 | −6.13E−04 | −1.67E−04 | 2.83E−04 |
| 4 | −3.68E−01 | −4.46E−01 | 7.20E−02 | 1.65E+00 |
| 6 | 1.56E−02 | −9.74E−03 | −3.19E−02 | −1.92E−02 |
| 7 | 8.92E−03 | 5.82E−03 | 1.91E−03 | −4.29E−04 |

TABLE 6

Example 2 Data on Radius of Curvature

| Si | Effective Diameter Edge | | Ratio of Effective Diameter Edge to Center | |
|---|---|---|---|---|
| 2 | \|RX2\| | 1.90 | \|RX2\|/\|R2\| | 2.56 |
| 3 | \|RX3\| | 1.94 | \|RX3\|/\|R3\| | 1.04 |
| 4 | \|RX4\| | 4.66 | \|RX4\|/\|R4\| | 0.69 |
| 6 | \|RX6\| | 3.71 | \|RX6\|/\|R6\| | 0.96 |
| 7 | \|RX7\| | 2.66 | \|RX7\|/\|R7\| | 2.30 |

TABLE 7

Example 3 Lens Data

| Si | Ri | Di | Ndj | νdj |
|---|---|---|---|---|
| 1 | 500.00 | 1.20 | 1.53 | 55.2 |
| 2* | 0.65 | 1.34 | | |
| 3* | 1.24 | 2.12 | 1.61 | 25.5 |
| 4* | 3.68 | 0.15 | | |
| 5 | Aperture diaphragm | 0.22 | | |
| 6* | 4.09 | 2.00 | 1.53 | 55.2 |
| 7* | −1.06 | 1.00 | | |
| 8 | ∞ | 0.50 | 1.52 | 64.2 |
| 9 | ∞ | 0.34 | | |
| Imaging surface | — | 0.00 | | |

Example 3 Various Data

| | |
|---|---|
| Fno. | 2.8 |
| 2ω | 158.0 |
| IH | 2.25 |

TABLE 7-continued

| | | |
|---|---|---|
| Bf | 1.67 | |
| L | 8.69 | |
| f | 1.02 | |
| f1 | −1.22 | |
| f2 | 2.29 | |
| f3 | 1.83 | |
| f12 | −12.46 | |
| f23 | 3.93 | |

TABLE 8

Example 3 Aspheric Data

| Si | KA | RB3 | RB4 | RB5 | RB6 |
|---|---|---|---|---|---|
| 2 | 3.92E−02 | −6.99E−02 | −2.96E−02 | 1.25E−02 | 8.13E−03 |
| 3 | 0.00E+00 | −6.29E−02 | 5.39E−02 | −1.83E−03 | 8.86E−03 |
| 4 | 0.00E+00 | −9.89E−02 | 2.15E−01 | 1.26E−01 | −1.10E−01 |
| 6 | 0.00E+00 | −6.19E−02 | 4.98E−03 | 1.94E−02 | 2.93E−02 |
| 7 | 0.00E+00 | −6.11E−02 | 8.22E−02 | −2.74E−02 | −2.67E−02 |

| Si | RB7 | RB8 | RB9 | RB10 |
|---|---|---|---|---|
| 2 | 4.52E−03 | 4.60E−04 | −8.84E−04 | −1.13E−03 |
| 3 | −2.10E−03 | −1.18E−03 | 3.15E−05 | 8.54E−04 |
| 4 | −2.47E−01 | −1.72E−01 | 1.52E−03 | 1.22E+00 |
| 6 | 1.21E−02 | −1.44E−02 | −2.73E−02 | 1.02E−02 |
| 7 | 8.71E−03 | 6.53E−03 | 2.09E−03 | −1.09E−03 |

TABLE 9

Example 3 Data on Radius of Curvature

| Si | Effective Diameter Edge | | Ratio of Effective Diameter Edge to Center | |
|---|---|---|---|---|
| 2 | |RX2| | 1.82 | |RX2|/|R2| | 2.79 |
| 3 | |RX3| | 1.69 | |RX3|/|R3| | 1.36 |
| 4 | |RX4| | 2.79 | |RX4|/|R4| | 0.76 |
| 6 | |RX6| | 5.18 | |RX6|/|R6| | 1.27 |
| 7 | |RX7| | 1.90 | |RX7|/|R7| | 1.79 |

TABLE 10

Example 4 Lens Data

| Si | Ri | Di | Ndj | vdj |
|---|---|---|---|---|
| 1 | 800.00 | 1.20 | 1.53 | 55.2 |
| 2* | 0.58 | 1.04 | | |
| 3* | 1.11 | 2.12 | 1.61 | 25.5 |
| 4* | 4.92 | 0.15 | | |
| 5 | Aperture diaphragm | 0.22 | | |
| 6* | 4.50 | 2.00 | 1.53 | 55.2 |
| 7* | −0.97 | 1.00 | | |
| 8 | ∞ | 0.50 | 1.52 | 64.2 |
| 9 | ∞ | 0.21 | | |
| Imaging surface | — | 0.00 | | |

Example 4 Various Data

| | |
|---|---|
| Fno. | 2.8 |
| 2ω | 158.0 |
| IH | 2.25 |
| Bf | 1.54 |
| L | 8.26 |
| f | 0.99 |
| f1 | −1.09 |
| f2 | 1.93 |

TABLE 10-continued

| | |
|---|---|
| f3 | 1.71 |
| f12 | −18.07 |
| f23 | 5.13 |

TABLE 11

Example 4 Aspheric Data

| Si | KA | RB3 | RB4 | RB5 | RB6 |
|---|---|---|---|---|---|
| 2 | 3.54E−02 | −9.42E−02 | −3.45E−02 | 1.09E−02 | 7.40E−03 |
| 3 | 0.00E+00 | −9.51E−02 | 5.94E−02 | −7.26E−04 | 8.70E−03 |
| 4 | 0.00E+00 | −9.79E−02 | 7.59E−02 | 8.49E−02 | 4.65E−03 |
| 6 | 0.00E+00 | −5.86E−02 | 1.34E−02 | 1.99E−02 | 2.99E−02 |
| 7 | 0.00E+00 | −5.48E−02 | 8.48E−02 | −2.60E−02 | −2.61E−02 |

| Si | RB7 | RB8 | RB9 | RB10 |
|---|---|---|---|---|
| 2 | 4.40E−03 | 3.35E−04 | −1.00E−03 | −1.23E−03 |
| 3 | −2.34E−03 | −1.51E−03 | −3.14E−04 | 4.98E−04 |
| 4 | 9.37E−02 | 1.64E−01 | −4.79E−01 | −3.08E−01 |
| 6 | 9.88E−03 | −1.61E−02 | −2.76E−02 | 1.13E−02 |
| 7 | 8.99E−03 | 6.68E−03 | 2.20E−03 | −9.83E−04 |

TABLE 12

Example 4 Data on Radius of Curvature

| Si | Effective Diameter Edge | | Ratio of Effective Diameter Edge to Center | |
|---|---|---|---|---|
| 2 | |RX2| | 1.70 | |RX2|/|R2| | 2.94 |
| 3 | |RX3| | 1.74 | |RX3|/|R3| | 1.57 |
| 4 | |RX4| | 5.45 | |RX4|/|R4| | 1.11 |
| 6 | |RX6| | 5.09 | |RX6|/|R6| | 1.13 |
| 7 | |RX7| | 1.90 | |RX7|/|R7| | 1.96 |

TABLE 13

Example 5 Lens Data

| Si | Ri | Di | Ndj | vdj |
|---|---|---|---|---|
| 1 | 300.00 | 0.90 | 1.53 | 55.4 |
| 2* | 0.69 | 1.45 | | |
| 3* | 1.95 | 2.12 | 1.61 | 25.5 |
| 4* | 36.89 | 0.15 | | |
| 5 | Aperture diaphragm | 0.22 | | |
| 6* | 4.19 | 2.00 | 1.53 | 55.4 |
| 7* | −1.14 | 1.00 | | |
| 8 | ∞ | 0.50 | 1.52 | 64.2 |
| 9 | ∞ | 0.54 | | |
| Imaging surface | — | 0.00 | | |

Example 5 Various Data

| | |
|---|---|
| Fno. | 2.8 |
| 2ω | 155.2 |
| IH | 2.25 |
| Bf | 1.87 |
| L | 8.70 |
| f | 0.89 |
| f1 | −1.30 |
| f2 | 3.28 |
| f3 | 1.94 |
| f12 | −7.02 |
| f23 | 2.75 |

TABLE 14

Example 5 Aspheric Data

| Si | KA | RB3 | RB4 | RB5 | RB6 |
|---|---|---|---|---|---|
| 2 | −1.96E−02 | −6.40E−02 | −1.35E−02 | 1.64E−02 | 2.98E−03 |
| 3 | 0.00E+00 | −1.88E−02 | 2.30E−02 | −1.80E−02 | 7.21E−03 |
| 4 | 0.00E+00 | −5.46E−02 | 1.85E−01 | −7.84E−02 | −1.13E−01 |
| 6 | 0.00E+00 | −6.26E−02 | 4.17E−02 | 2.39E−03 | 3.91E−02 |
| 7 | 0.00E+00 | −3.41E−02 | 8.94E−02 | −1.16E−02 | −2.07E−02 |

| Si | RB7 | RB8 | RB9 | RB10 |
|---|---|---|---|---|
| 2 | −6.67E−04 | −1.88E−03 | −7.34E−04 | 3.80E−04 |
| 3 | −1.92E−03 | −7.93E−04 | −1.84E−04 | 3.71E−04 |
| 4 | −8.53E−02 | −1.07E−01 | 2.42E−01 | 5.35E−01 |
| 6 | −3.82E−02 | −4.40E−02 | −1.85E−02 | 6.32E−02 |
| 7 | 1.07E−02 | 5.68E−03 | 5.66E−04 | −2.18E−03 |

TABLE 15

Example 5 Data on Radius of Curvature

| Si | Effective Diameter Edge | | Ratio of Effective Diameter Edge to Center | |
|---|---|---|---|---|
| 2 | |RX2| | 1.92 | |RX2|/|R2| | 2.79 |
| 3 | |RX3| | 2.71 | |RX3|/|R3| | 1.39 |
| 4 | |RX4| | 17.41 | |RX4|/|R4| | 0.47 |
| 6 | |RX6| | 5.40 | |RX6|/|R6| | 1.29 |
| 7 | |RX7| | 2.29 | |RX7|/|R7| | 2.00 |

TABLE 16

Example 6 Lens Data

| Si | Ri | Di | Ndj | vdj |
|---|---|---|---|---|
| 1 | 200.00 | 1.20 | 1.53 | 55.2 |
| 2* | 0.78 | 1.62 | | |
| 3* | 1.69 | 2.12 | 1.633 | 23.6 |
| 4* | 5.40 | 0.15 | | |
| 5 | Aperture diaphragm | 0.22 | | |
| 6* | 3.66 | 2.00 | 1.53 | 55.2 |
| 7* | −1.20 | 1.00 | | |
| 8 | ∞ | 0.50 | 1.52 | 64.2 |
| 9 | ∞ | 0.52 | | |
| Imaging surface | — | 0.00 | | |

Example 6 Various Data

| | |
|---|---|
| Fno. | 2.8 |
| 2ω | 155.4 |
| IH | 2.25 |
| Bf | 1.85 |
| L | 9.16 |
| f | 1.03 |
| f1 | −1.47 |
| f2 | 3.17 |
| f3 | 1.97 |
| f12 | −8.17 |
| f23 | 3.01 |

TABLE 17

Example 6 Aspheric Data

| Si | KA | RB3 | RB4 | RB5 | RB6 |
|---|---|---|---|---|---|
| 2 | 3.11E−02 | −3.77E−02 | −2.59E−02 | 1.05E−02 | 7.78E−03 |
| 3 | 0.00E+00 | −5.79E−02 | 5.23E−02 | −4.90E−03 | 6.74E−03 |
| 4 | 0.00E+00 | −1.09E−01 | 2.03E−01 | 1.71E−01 | −1.81E−01 |
| 6 | 0.00E+00 | −5.91E−02 | 1.62E−02 | 2.76E−02 | 3.16E−02 |
| 7 | 0.00E+00 | −4.31E−02 | 8.61E−02 | −2.47E−02 | −2.33E−02 |

TABLE 17-continued

Example 6 Aspheric Data

| Si | RB7 | RB8 | RB9 | RB10 |
|---|---|---|---|---|
| 2 | 4.66E−03 | 6.88E−04 | −7.00E−04 | −9.73E−04 |
| 3 | −2.90E−03 | −1.73E−03 | −4.49E−04 | 3.56E−04 |
| 4 | −5.54E−01 | −6.72E−01 | 1.32E−01 | 2.99E+00 |
| 6 | 7.63E−03 | −2.40E−02 | −3.61E−02 | 1.14E−02 |
| 7 | 1.13E−02 | 7.74E−03 | 1.91E−03 | −2.27E−03 |

TABLE 18

Example 6 Data on Radius of Curvature

| Si | Effective Diameter Edge | | Ratio of Effective Diameter Edge to Center | |
|---|---|---|---|---|
| 2 | |RX2| | 1.91 | |RX2|/|R2| | 2.46 |
| 3 | |RX3| | 2.17 | |RX3|/|R3| | 1.29 |
| 4 | |RX4| | 4.94 | |RX4|/|R4| | 0.91 |
| 6 | |RX6| | 4.21 | |RX6|/|R6| | 1.15 |
| 7 | |RX7| | 230 | |RX7|/|R7| | 1.92 |

Furthermore, in the imaging lenses according to Examples 1 to 6, all the materials of the first lens L1, the second lens L2, and the third lens L3 are plastic.

Table 19 shows values corresponding to Conditional Expressions (1) to (12) in the imaging lens according to Examples 1 to 6. In Examples 1 to 6, the d-line is set as a reference wavelength, and the values at the reference wavelength are shown in Table 19. As can be seen from Table 19, Examples 1 to 6 satisfy Conditional Expressions (1) to (8).

TABLE 19

| | Conditional Expression | | | | | |
|---|---|---|---|---|---|---|
| Example | (1) vd3/vd2 | (2) \|f1/f23\| | (3) \|RX2\|/\|R2\| | (4) f2/f3 | (5) L/f | (6) Bf/f |
| 1 | 2.16 | 0.48 | 2.42 | 1.52 | 8.88 | 1.75 |
| 2 | 2.17 | 0.48 | 2.56 | 1.81 | 10.07 | 2.07 |
| 3 | 2.16 | 0.31 | 2.79 | 1.25 | 8.48 | 1.63 |
| 4 | 2.16 | 0.21 | 2.94 | 1.13 | 8.37 | 1.56 |
| 5 | 2.17 | 0.47 | 2.79 | 1.69 | 9.81 | 2.11 |
| 6 | 2.16 | 0.49 | 2.46 | 1.60 | 8.85 | 1.79 |

| | Conditional Expression | | | | | |
|---|---|---|---|---|---|---|
| Example | (7) D1/f | (8) \|R4/D3\| | (9) D2/f | (10) D4/f | (11) (D2 + D3)/f | (12) f2/f |
| 1 | 1.17 | 3.20 | 1.58 | 0.15 | 3.65 | 2.96 |
| 2 | 1.00 | 2.96 | 2.02 | 0.17 | 4.37 | 3.91 |
| 3 | 1.17 | 1.74 | 1.31 | 0.15 | 3.38 | 2.23 |
| 4 | 1.21 | 2.32 | 1.05 | 0.15 | 3.20 | 1.95 |
| 5 | 1.02 | 17.40 | 1.63 | 0.17 | 4.02 | 3.70 |
| 6 | 1.16 | 2.55 | 1.57 | 0.14 | 3.60 | 3.06 |

Figure 9:
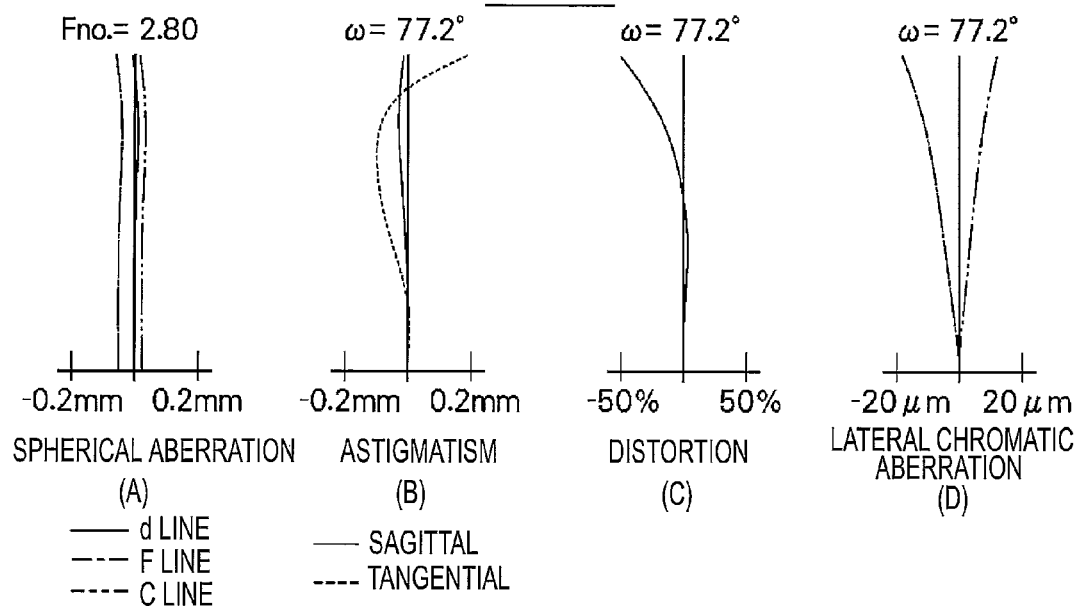
FIG. 9 shows diagrams illustrating various diagrams of the imaging lens according to Example 1 of the invention.
Figure 9:
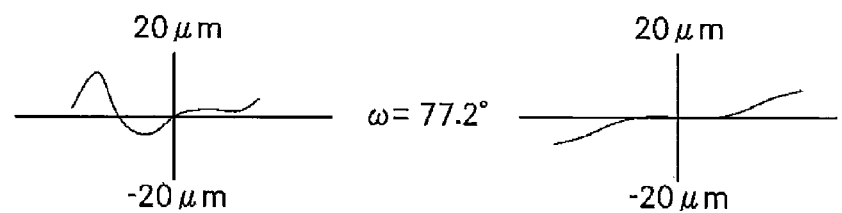
Figure 9:
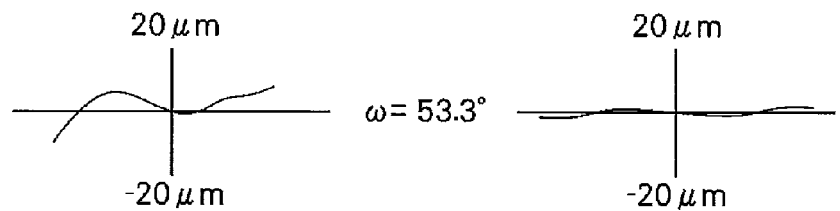
Figure 9:
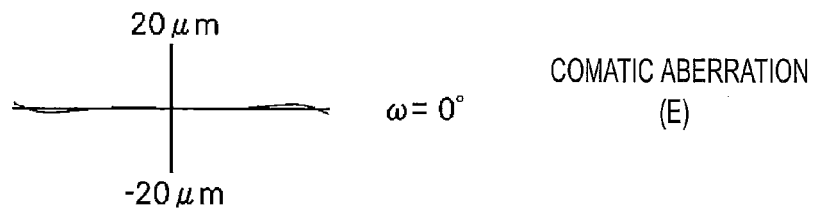
Figure 10:
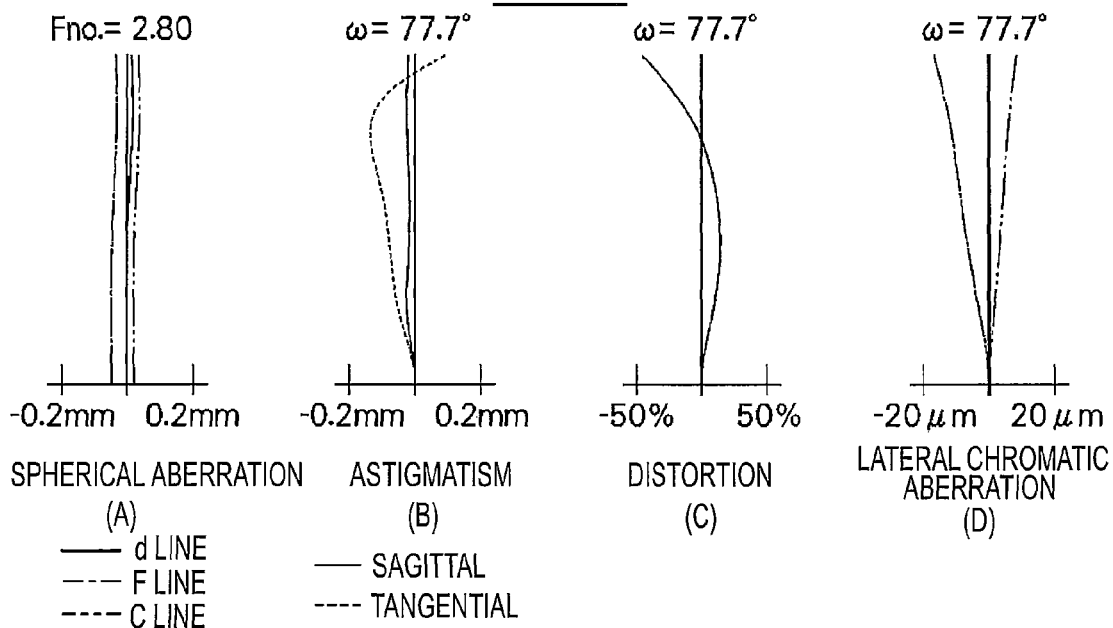
FIG. 10 shows diagrams illustrating various diagrams of the imaging lens according to Example 2 of the invention.
Figure 10:
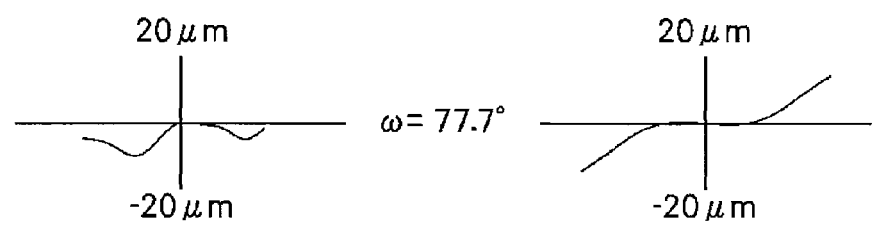
Figure 10:
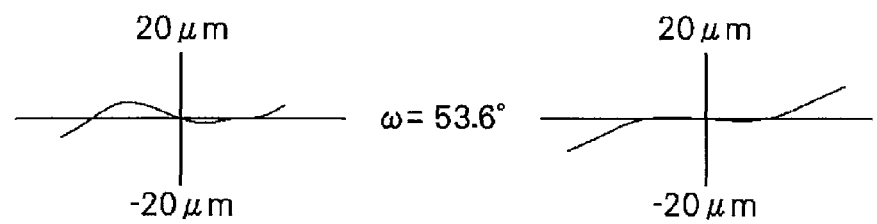
Figure 10:
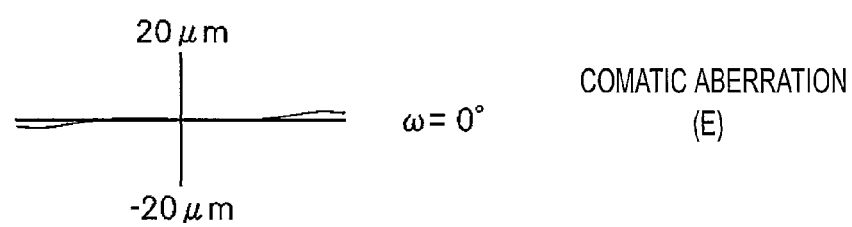
Figure 11:
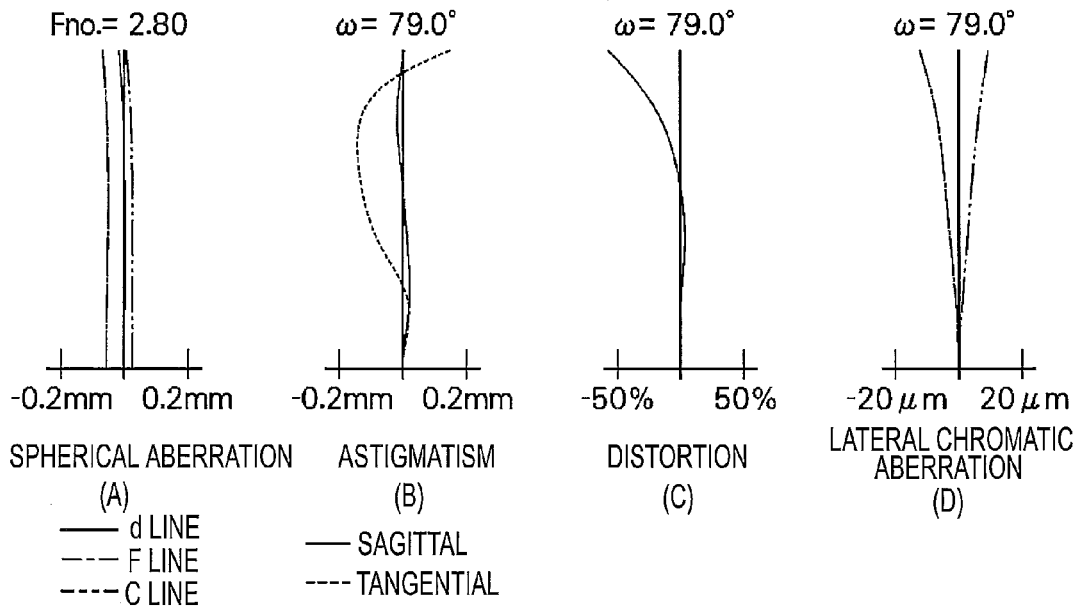
FIG. 11 shows diagrams illustrating various diagrams of the imaging lens according to Example 3 of the invention.
Figure 11:
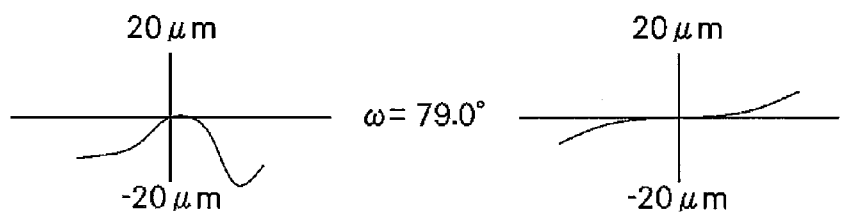
Figure 11:
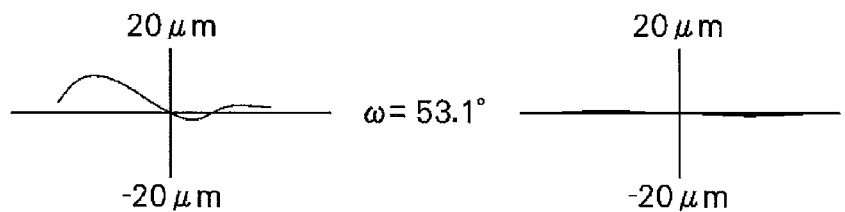
Figure 11:
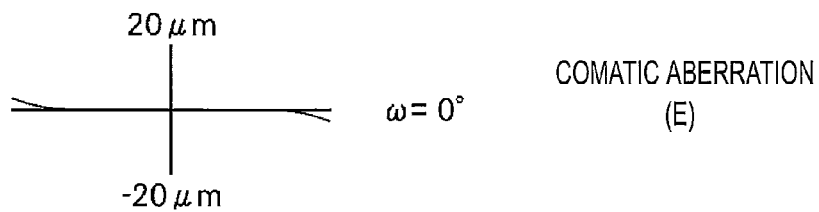
Figure 12:
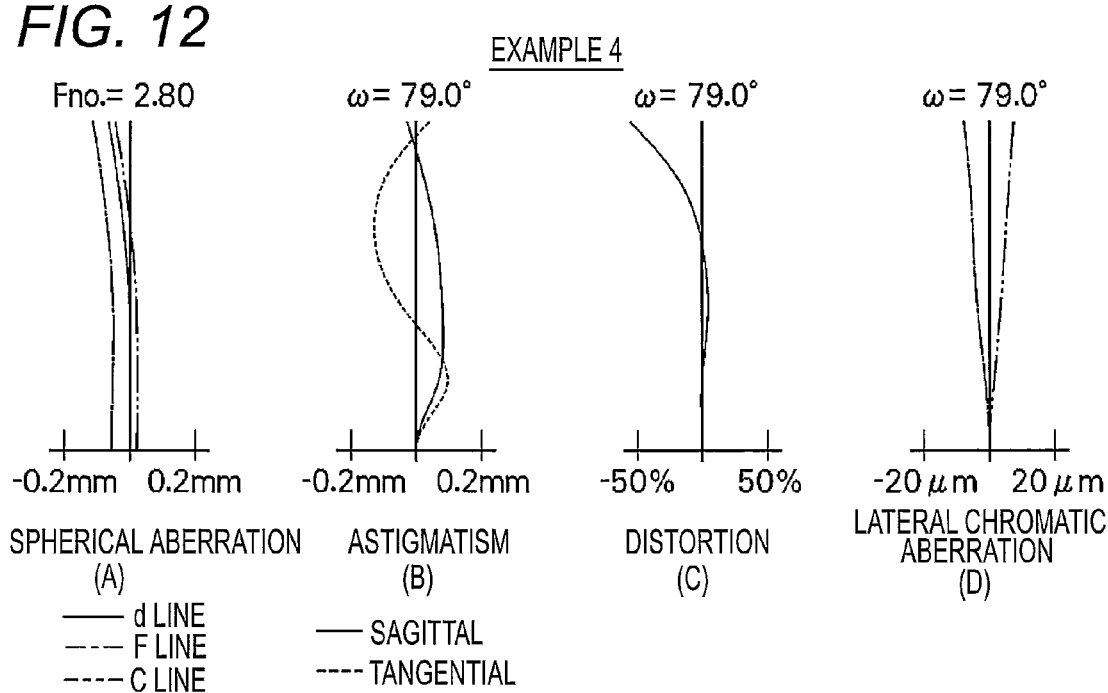
FIG. 12 shows diagrams illustrating various diagrams of the imaging lens according to Example 4 of the invention.
Figure 12:
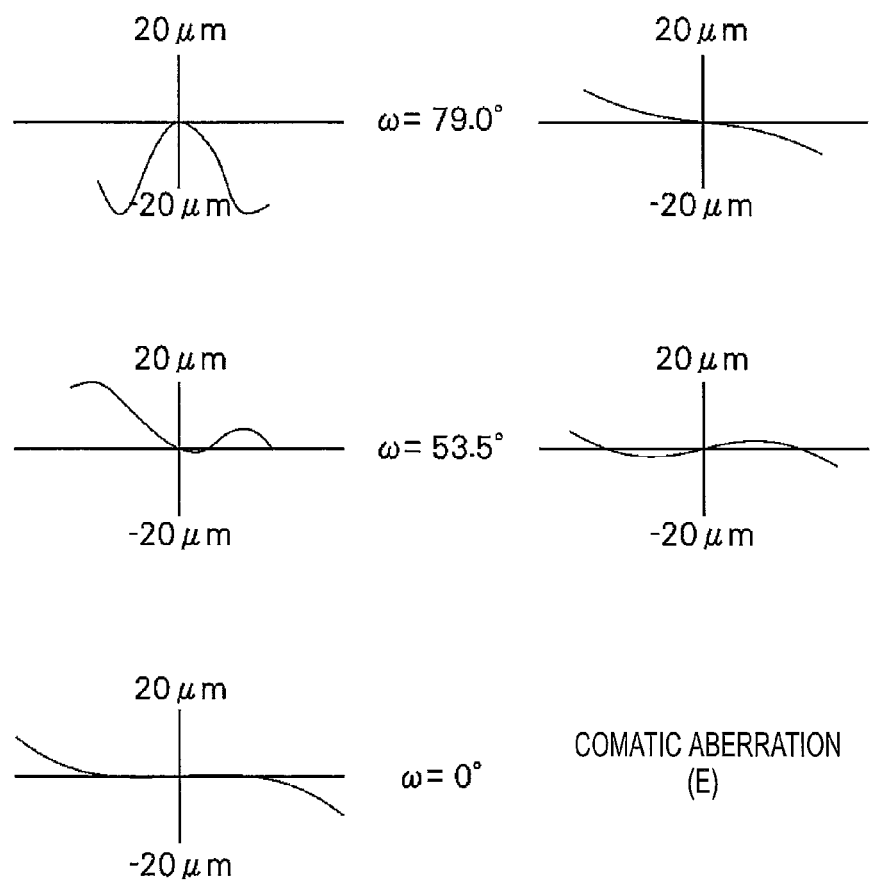
Figure 13:
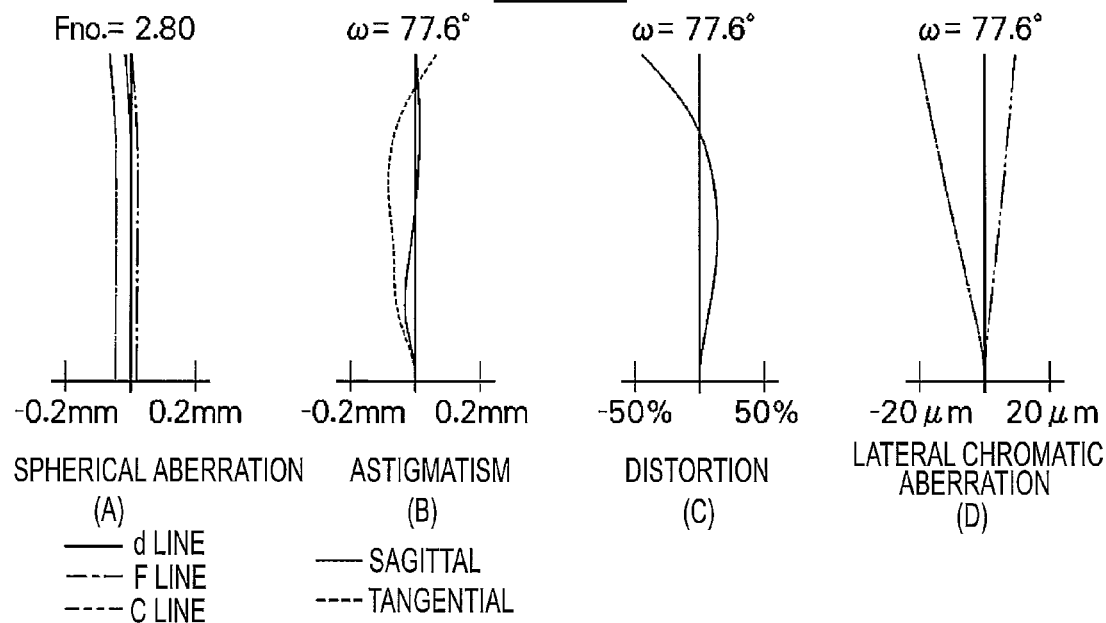
FIG. 13 shows diagrams illustrating various diagrams of the imaging lens according to Example 5 of the invention.
Figure 13:
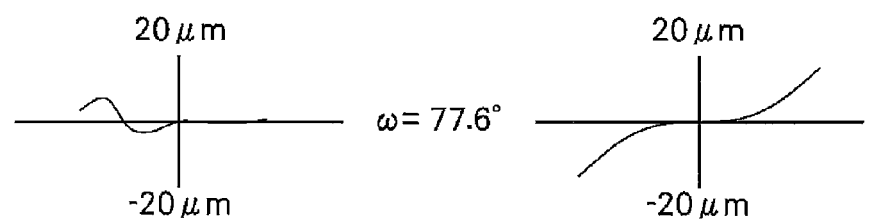
Figure 13:
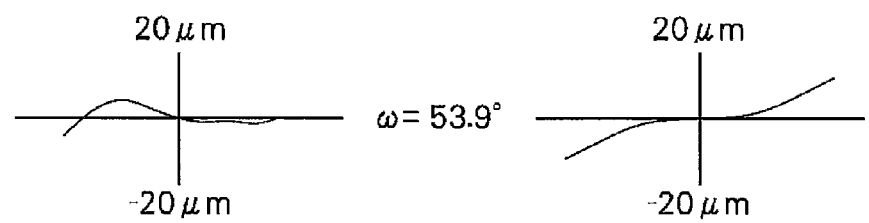
Figure 13:
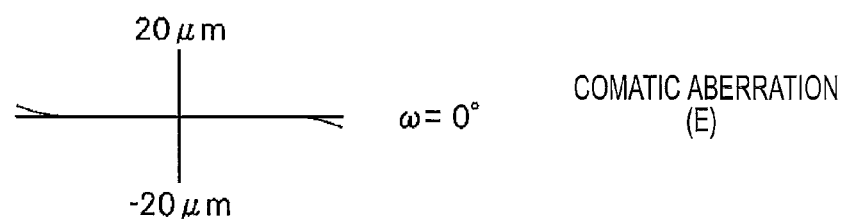
Figure 14:
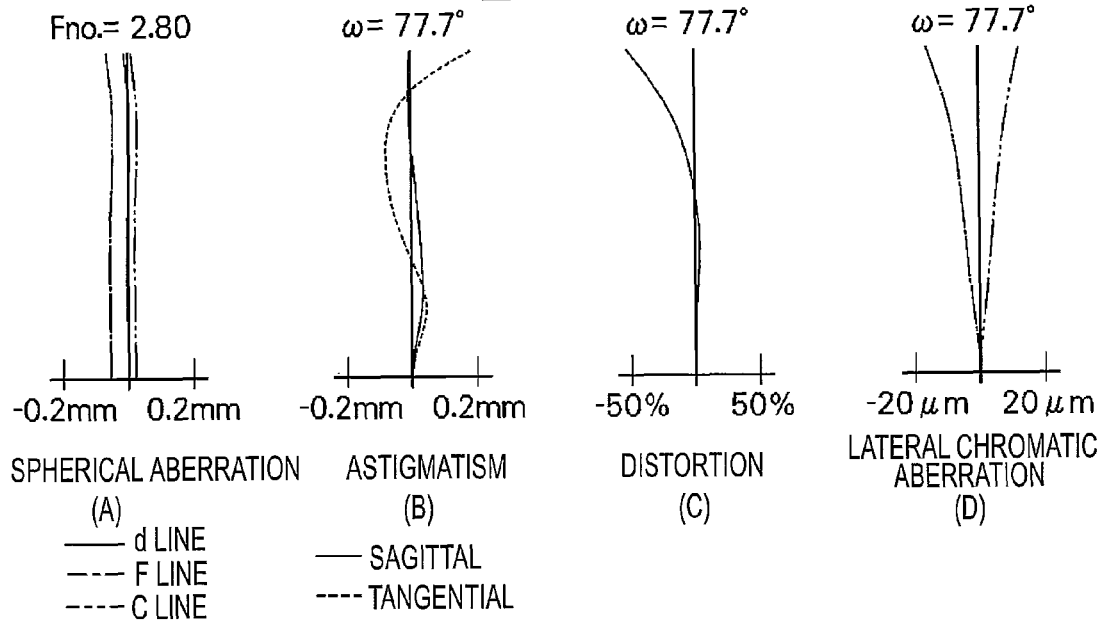
FIG. 14 shows diagrams illustrating various diagrams of the imaging lens according to Example 6 of the invention.
Figure 14:
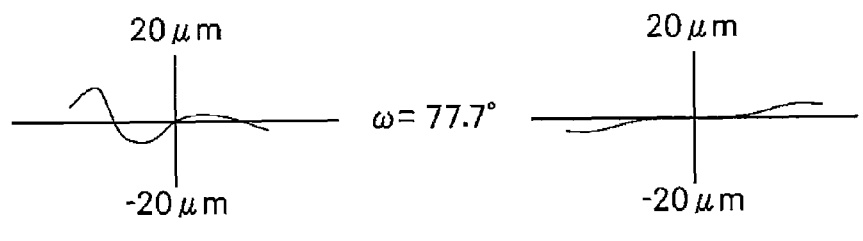
Figure 14:
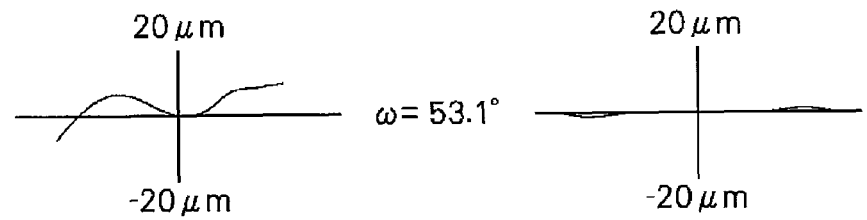
Figure 14:
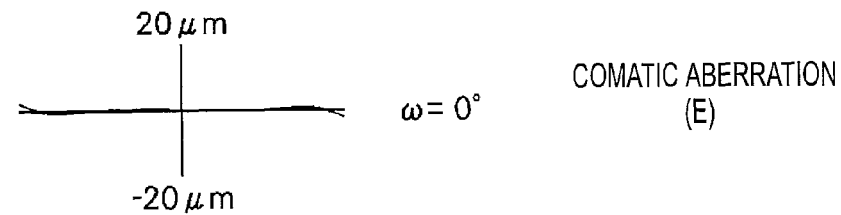

FIGS. 9(A), 9(B), 9(C), 9(D), and 9(E) show aberration diagrams of spherical aberration, astigmatism, distortion (distortion aberration), lateral chromatic aberration (magnification chromatic aberration), and comatic aberration (lateral aberration) of the imaging lens according to Example 1. Each of the aberration diagrams shows aberration in which the d-line (587.56 nm) is set as a reference wavelength. The spherical aberration diagrams and the lateral chromatic aberration diagrams show aberrations at the F-line (a wavelength of 486.13 nm) and the C-line (a wavelength of 656.27 nm) The Fno. in the spherical aberration diagram represents an F number, the ω in other diagrams represents a half angle of view. In addition, each aberration diagram of distortion shows a deviation amount from an ideal image height expressed by f×tan φ, where f is the focal length of the whole system and φ (assumed as a variable, 0≦φ≦ω) is the half angle of view. FIG. 9(E) shows comatic aberration diagrams by collecting five aberration diagrams in the tangential and sagittal directions at the half angles of view. The comatic aberration diagrams in the left hand in FIG. 9(E) are those in the tangential direction and the comatic aberration diagrams in the right hand in FIG. 9(E) are those in the sagittal direction. Since comatic aberrations in the tangential and sagittal directions on the optical axis are identical at ω=0°, the comatic aberration diagram in the sagittal direction is omitted.

Likewise, FIGS. 10(A) to 10(E), FIGS. 11(A) to 11(E), FIGS. 12(A) to 12(E), FIGS. 13(A) to 13(E), and FIGS. 14(A) to 14(E) show aberration diagrams of spherical aberrations, astigmatism, distortions (distortion aberration), lateral chromatic aberrations, and comatic aberrations of the imaging lenses according to Examples 2 to 6. As can be seen from the aberration diagrams, the aberrations in Examples 1 to 6 are satisfactorily corrected in the visible part of the spectrum.

As described above, each of the imaging lenses according to Example 1 to 6 has a small number of lenses, for example, three lenses, and is made of plastic, and thus it is possible to manufacture the lens system with a small size and low cost. The imaging lenses according to Examples 1 to 6 are configured so that the total angle of view is a wide angle of 150 degrees or more, the F number is less than 2.8, and the aberrations are satisfactorily corrected, thereby obtaining an excellent performance. These imaging lenses are applicable to surveillance cameras, on-board cameras for taking a picture of the front, the side, and the rear of a vehicle, and the like.

Embodiment of Imaging Apparatus

Figure 15:
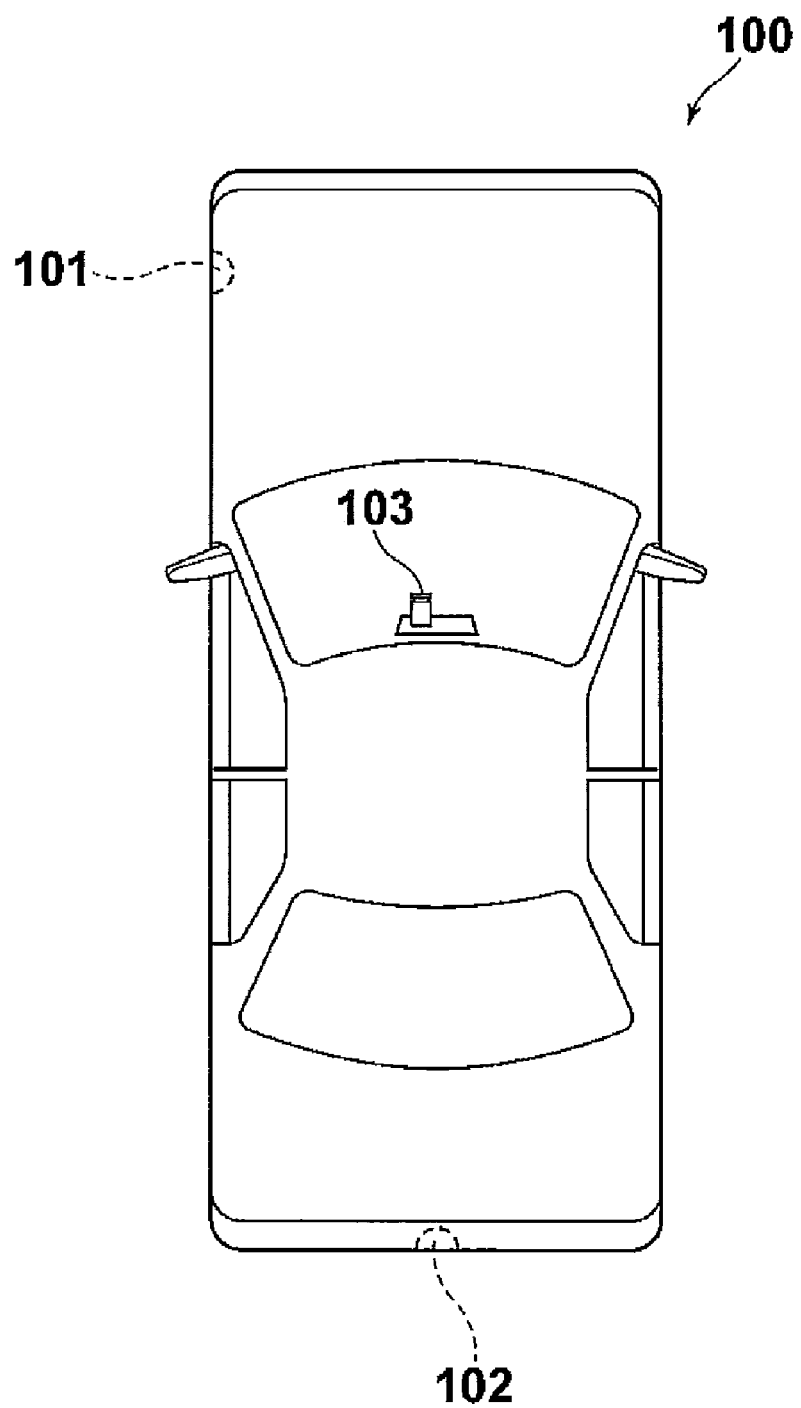
FIG. 15 shows a diagram illustrating an arrangement of an on-board imaging apparatus according to an exemplary embodiment of the invention.

FIG. 15 shows a feature of the vehicle 100 equipped with the imaging apparatus and the imaging apparatus according to the embodiment. In FIG. 15, the vehicle 100 includes an outside-vehicle camera 101 for photographing a blind spot area of the passenger seat side, an outside-vehicle camera 102 for photographing a blind spot area of the rear of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are the imaging apparatuses, and include the imaging lens according to the embodiment of the invention and the imaging device converting an optical image formed by the imaging lens into an electric signal.

The imaging lenses according to the examples of the invention have the above-mentioned advantages. Hence, it is possible to form the outside-vehicle cameras 101 and 102 and the in-vehicle camera 103 with a small size and low cost, it is possible to take an image with a wide angle of view, and it is possible to obtain an excellent picture.

The invention has been described with reference to the embodiment and the examples, but the invention is not limited to the embodiment mentioned above, and may be modified to various forms. For example, the values of a radius of curvature, an on-axis surface spacing, a refractive index, an Abbe number, and an aspheric coefficient of the lens components are not limited to the values noted in the numerical examples, and may have other values.

Furthermore, in the above-mentioned examples, all the lenses are made of a homogeneous material, but a gradient index lens may be used. Further, in the above-mentioned examples, all the lenses are refractive lenses having aspheric surfaces, but one or more diffractive optical elements may be formed on one surface or a plurality of surfaces.

Further, in the embodiment of the imaging apparatus, the example in which the invention is applied to the on-board camera has been described with reference to the drawing, but the invention is not limited to this application, and is also applicable to other imaging apparatuses such as a surveillance camera.

Embodiments of the invention are applicable to the imaging apparatus, particularly, to on-board cameras, cameras for mobile terminals, surveillance cameras, and the like.

What is claimed is:

1. An imaging lens comprising: in order from an object side thereof,
a first lens of a negative lens having a concave surface on an image side thereof and having at least one aspheric surface;
a second lens of a positive lens having at least one aspheric surface;
a stop; and
a third lens of a positive lens having a convex surface on the image side thereof and at least one aspheric surface,
wherein the following Conditional Expressions (1) and (2) are satisfied:

$$1.5 < vd3/vd2 \qquad (1)$$

$$0.0 < |f1/f23| < 0.5 \qquad (2)$$

wherein
vd2 represents an Abbe number of the second lens at the d-line,
vd3 represents an Abbe number of the third lens at the d-line,
f1 represent a focal length of the first lens, and
f23 represents a composite focal length of the second and third lenses.

2. The imaging lens according to claim 1, wherein the following Conditional Expression (3) is satisfied:

$$1.5 < |RX2|/|R2| \qquad (3)$$

wherein
|R2| represents an absolute value of a radius of curvature at the center of the image-side surface of the first lens, and
|RX2| represents an absolute value of a radius of curvature at an effective diameter edge of the image-side surface of the first lens.

3. The imaging lens according to claim 1, wherein the following Conditional Expression (4) is satisfied:

$$0.8 < f2/f3 < 2.2 \qquad (4)$$

wherein
f2 represents a focal length of the second lens, and
f3 represents a focal length of the third lens.

4. The imaging lens according to claim 1, wherein the following Conditional Expression (5) is satisfied:

$$5.0 < L/f < 12.0 \qquad (5)$$

wherein
L represents a distance along an optical axis from an object-side surface of the first lens to an imaging plane of the imaging lens; and
f represents a focal length of the imaging lens.

5. The imaging lens according to claim 1, wherein the first lens has an Abbe number of 40 or more at the d-line, the third lens has an Abbe number of 40 or more at the d-line, and the second lens has an Abbe number of 29 or less at the d-line.

6. The imaging lens according to claim 1, wherein the following Conditional Expression (6) is satisfied:

$$1.0 < Bf/f < 2.5 \tag{6}$$

wherein

Bf represents a distance along an optical axis from an image-side surface of a lens closest to the image side to an imaging plane of the imaging lens, and f represents a focal length of the imaging lens.

7. The imaging lens according to claim 1, wherein the following Conditional Expression (7) is satisfied:

$$D1/f < 4 \tag{7}$$

wherein f represents a focal length of the imaging lens, and

D1 represents a center thickness of the first lens.

8. The imaging lens according to claim 1, wherein the following Conditional Expression (8) is satisfied:

$$0.5 < |R4/D3| < 20.0 \tag{8}$$

wherein

R4 represents a radius of curvature of an image-side surface of the second lens, and D3 represents a center thickness of the second lens.

9. An imaging apparatus comprising an imaging lens according to claim 1.

* * * * *